(12) United States Patent
Dahl et al.

(10) Patent No.: US 11,572,158 B2
(45) Date of Patent: *Feb. 7, 2023

(54) SEMI-LEVERED SHRINK LANDING GEAR

(71) Applicant: The Boeing Company, Chicago, IL (US)

(72) Inventors: Bruce A. Dahl, Kent, WA (US); Seiya Sakurai, Fall City, WA (US)

(73) Assignee: The Boeing Company, Chicago, IL (US)

( * ) Notice: Subject to any disclaimer, the term of this patent is extended or adjusted under 35 U.S.C. 154(b) by 226 days.

This patent is subject to a terminal disclaimer.

(21) Appl. No.: 17/007,105

(22) Filed: Aug. 31, 2020

(65) Prior Publication Data
US 2020/0398974 A1    Dec. 24, 2020

Related U.S. Application Data

(63) Continuation of application No. 15/611,844, filed on Jun. 2, 2017, now Pat. No. 10,800,516.

(51) Int. Cl.
*B64C 25/20* (2006.01)
*B64C 25/10* (2006.01)
(Continued)

(52) U.S. Cl.
CPC .............. *B64C 25/20* (2013.01); *B64C 25/04* (2013.01); *B64C 25/10* (2013.01); *B64C 25/34* (2013.01); *B64C 2025/008* (2013.01)

(58) Field of Classification Search
CPC ... B64C 25/20; B64C 25/10; B64C 2025/008; B64C 25/18; B64C 25/34; B64C 25/60; B64C 25/22

See application file for complete search history.

(56) References Cited

U.S. PATENT DOCUMENTS 2,256,540 A   9/1941   Armstrong
2,420,066 A   5/1947   Hugh
(Continued)

FOREIGN PATENT DOCUMENTS

EP   0246949    5/1987
EP   2138398    12/2009
(Continued)

OTHER PUBLICATIONS

Torsion Sway Bar; dated Apr. 1, 2021; https://carlisuspension.com/product/dodge/dodge-ram-2500-3500/ram-components/13-18-3500-components/torsion-sway-bar/.

(Continued)

*Primary Examiner* — Philip J Bonzell
(74) *Attorney, Agent, or Firm* — Perman & Green, LLP

(57) ABSTRACT

An aircraft includes a landing gear having a shock strut, an outer sleeve at least partially surrounding the shock strut, and a shrink mechanism coupled to both the outer sleeve and the shock strut, where the shrink mechanism moves the shock strut relative to the outer sleeve. The shrink mechanism includes a shaft rotatably coupled to the outer sleeve, an anchor arm coupled to the shaft, a shrink arm coupled to the shaft, the shrink arm and the anchor arm being coupled to the shaft so as to rotate as a unit with the shaft about a shaft rotation axis, relative to the outer sleeve, at least 180° when the anchor arm is coupled to the structure within the wing of the aircraft, and a shrink link rotatably coupled to the shrink arm, the shrink link being configured to rotatably couple to the shock strut.

20 Claims, 14 Drawing Sheets

(51) Int. Cl.
  *B64C 25/04* (2006.01)
  *B64C 25/34* (2006.01)
  *B64C 25/00* (2006.01)

(56) References Cited

U.S. PATENT DOCUMENTS

| | | | |
|---|---|---|---|
| 2,754,072 A * | 7/1956 | Shapiro | B64C 25/14 244/102 SS |
| 2,933,271 A | 4/1960 | Maltby | |
| 2,967,682 A * | 1/1961 | Fullam | B64C 25/14 244/102 R |
| 4,540,142 A | 9/1985 | Veaux et al. | |
| 4,749,152 A | 6/1988 | Veaux et al. | |
| 5,100,083 A | 3/1992 | Large et al. | |
| 5,299,761 A | 4/1994 | Robin et al. | |
| 5,429,323 A | 7/1995 | Derrien et al. | |
| 5,460,340 A | 10/1995 | White | |
| 5,482,228 A | 1/1996 | Hoshino | |
| 6,182,925 B1 | 2/2001 | Kilner et al. | |
| 8,376,272 B2 | 2/2013 | Bennett et al. | |
| 8,448,900 B2 | 5/2013 | Mellor et al. | |
| 8,991,753 B2 | 3/2015 | Mellor et al. | |
| 8,998,133 B2 | 4/2015 | Cottet | |
| 9,481,452 B2 | 11/2016 | Lindahl et al. | |
| 9,499,280 B2 | 11/2016 | Mellor | |
| 10,384,767 B2 | 8/2019 | Cottet et al. | |
| 10,766,608 B2 | 9/2020 | Mellor et al. | |
| 10,800,516 B2 | 10/2020 | Dahl et al. | |
| 2009/0050736 A1 | 2/2009 | Bennett et al. | |
| 2009/0321560 A1 | 12/2009 | Luce et al. | |
| 2010/0116930 A1 | 5/2010 | Griffin | |
| 2010/0181423 A1 | 7/2010 | Martin et al. | |
| 2010/0219290 A1 | 9/2010 | Luce | |
| 2010/0288878 A1 | 11/2010 | Bennett | |
| 2011/0233327 A1 | 9/2011 | Mellor et al. | |
| 2013/0341457 A1 | 12/2013 | Wilson | |
| 2017/0253323 A1 | 9/2017 | Green et al. | |
| 2018/0001998 A1 | 1/2018 | Bennett | |
| 2018/0162522 A1 | 6/2018 | Luce | |
| 2018/0208298 A1 | 7/2018 | Cottet et al. | |
| 2019/0039723 A1 | 2/2019 | Dubrovsky et al. | |
| 2019/0185147 A1 | 6/2019 | Luce | |

FOREIGN PATENT DOCUMENTS

| | | |
|---|---|---|
| EP | 2489591 | 8/2012 |
| EP | 3213992 | 9/2017 |
| EP | 3335988 | 6/2018 |
| EP | 3437990 | 2/2019 |
| FR | 2686857 A1 * | 8/1993 ........... B64C 25/001 |
| GB | 484938 | 5/1938 |
| GB | 610698 | 10/1948 |
| GB | 670889 | 4/1952 |
| GB | 1216732 | 12/1970 |
| GB | 2137147 | 10/1984 |
| JP | 54022679 | 8/1979 |
| JP | 60071394 | 4/1985 |
| JP | 06008886 | 1/1994 |
| JP | 06219394 | 8/1994 |
| JP | 08338045 | 12/1996 |
| JP | 2001504829 | 2/2011 |
| JP | 2012111479 | 6/2012 |
| WO | 2006094145 | 9/2006 |
| WO | 2009047367 | 4/2009 |
| WO | 2011119283 | 9/2011 |

OTHER PUBLICATIONS

CE-9900XJF—XJ/MJ Antirock Front Sway Bar Kit; dated Apr. 1, 2021; https://www.rockjock4x4.com/CE-9900XJF.
European Search Report, European Application No. 18173205.8, dated Mar. 18, 2021.
Mellor, Mitchell, et al.; U.S. Appl. No. 15/444,986, filed Feb. 28, 2017.
Cottet, Justin, et al.; U.S. Appl. No. 15/445,652, filed Feb. 28, 2017.
Simpson, Mark, et al.; U.S. Appl. No. 15/445,836, filed Feb. 28, 2017.
Federal Aviation Administration, "Aviation Maintenance Technician Handbook—Airframe, Chapter 13", (2013), downloaded from faa.gov on Aug. 9, 2016.
Cottet, Justin, et al.; U.S. Appl. No. 15/415,346, filed Jan. 25, 2017.
Curry, Norman S. "Landing Gear Design Handbook" Lockheed-Georgia Company; First Edition, Jan. 1992, Revised Jul. 1984.
Cusworth, et al.; U.S. Appl. No. 15/490,440, filed Apr. 18, 2017; Aircraft Landing Gear Assembly and Method of Assembling the Same.
Mellor, et al.; U.S. Appl. No. 15/484,646, filed Apr. 11, 2017; Levered Landing Gear With Inner Shock Strut.
European Search Report, European Application No. 18173205 dated Jul. 18, 2018.
European Search Report, European Application No. 18155880 dated Jul. 26, 2018.
Japanese Office Action, Japanese Application No. 2018021945 dated Apr. 1, 2019.
European Search Report, European Application No. 19152374 dated May 15, 2019.
European Search Report, European Application No. 19188563, dated Dec. 16, 2019.

* cited by examiner

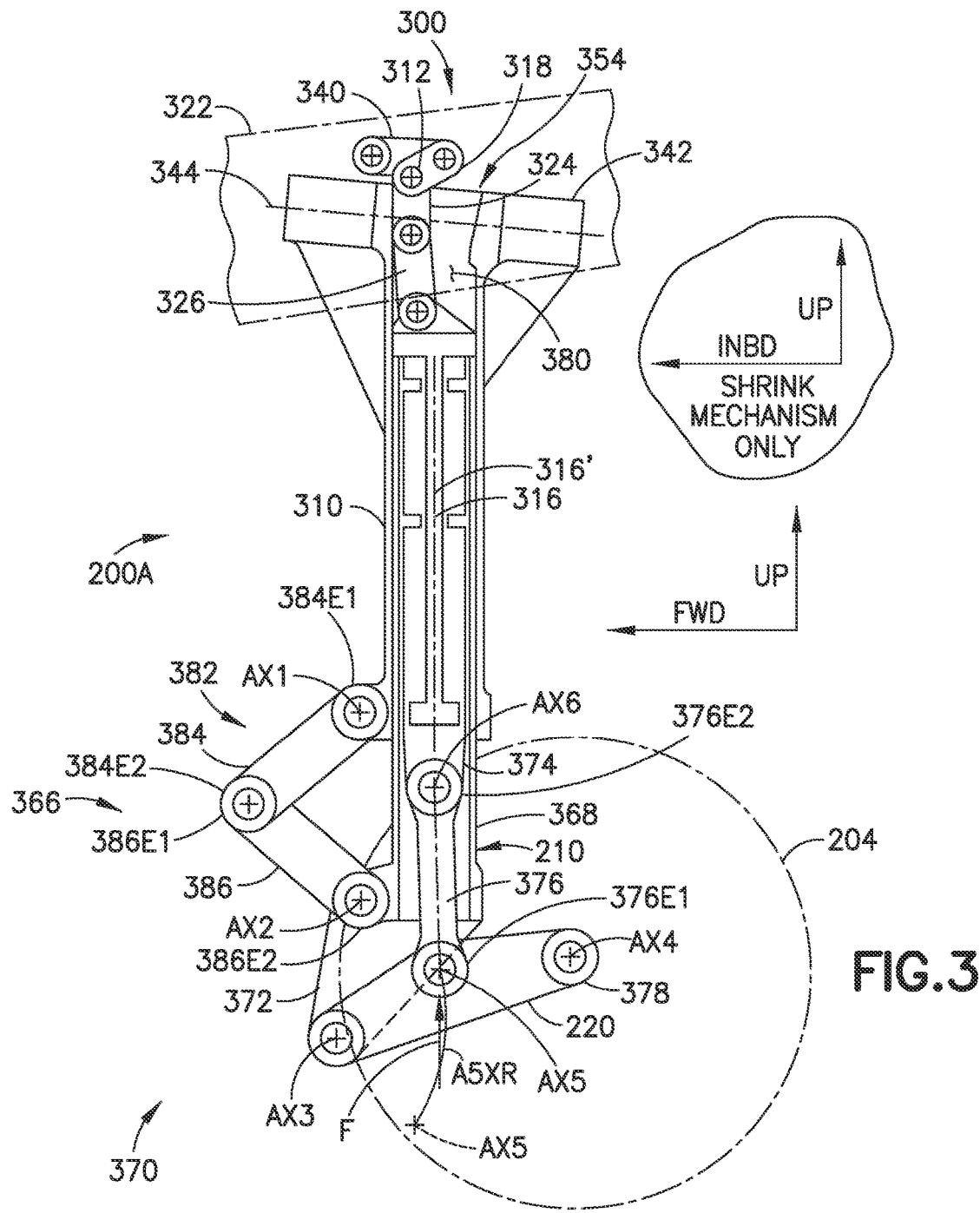
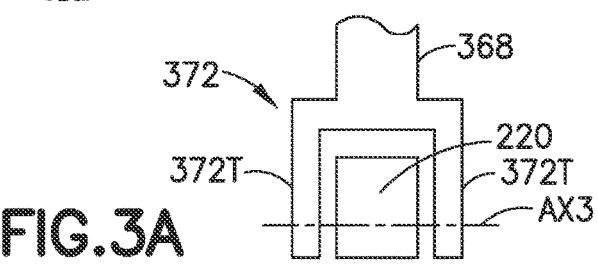
FIG.3
FIG.3A

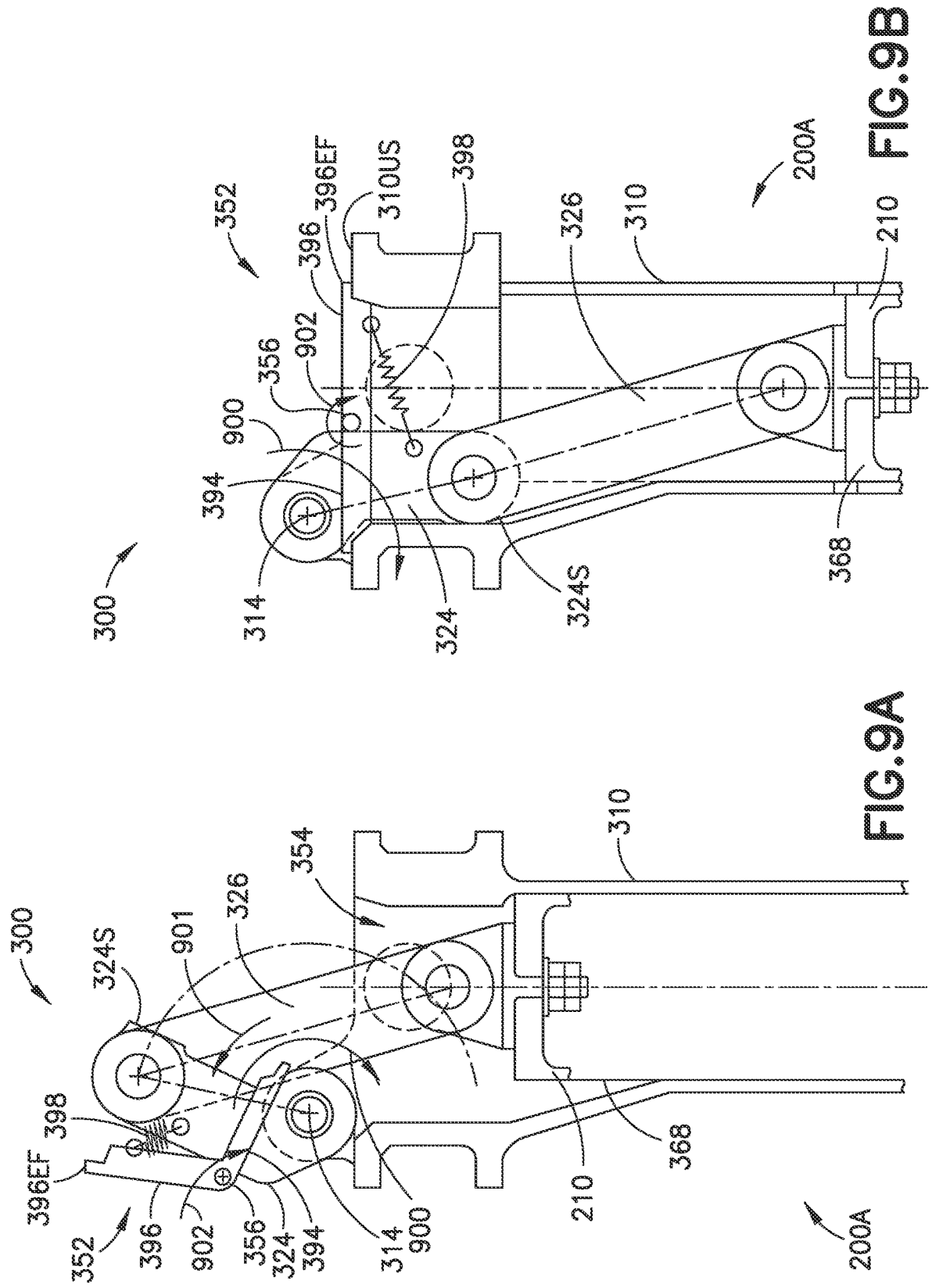

SEMI-LEVERED SHRINK LANDING GEAR

CROSS-REFERENCE TO RELATED APPLICATIONS

This application is a continuation of and claims the benefit of U.S. patent application Ser. No. 15/611,844 filed on Jun. 2, 2017 (now U.S. Pat. No. 10,800,516 issued on Oct. 13, 2020), the disclosure of which is incorporated herein by reference in its entirety.

BACKGROUND

1. Field

The aspects of the present disclosure generally relate to an aircraft landing gear and more particularly to semi-levered shrink landing gear.

2. Brief Description of Related Developments

Aircraft with one or more of large engine fan diameters, long fuselages, long wings, and specialized under-aircraft payload, for example, may use a tall landing gear structure to provide ground clearance to the engine and sufficient clearance during take-off. For example, during take-off, the nose of an aircraft rotates upward and the tail rotates downward to achieve an angle-of-attack at take-off. The longer the aircraft, the taller the landing gear is to achieve the take-off angle-of-attack. The taller the landing gear, the higher the angle-of-attack. Integrating longer/taller landing gear structures into the aircraft may impose expensive design constraints on the aircraft and also may add weight, which in turn requires greater fuel consumption by the aircraft. In addition, lengthening the landing gear increases the static height of the aircraft and may require the use of over-wing slides integrated into the aircraft and/or a larger wheel well (noting larger wheel wells may not be possible without redesigning the aircraft).

Landing gear structures on aircraft generally employ an OLEO (i.e., pneumatic air-oil hydraulic) shock strut, in which a piston compresses a volume that includes both a compressible gas and a substantially incompressible liquid. Generally, such landing gear structures include a main fitting (e.g., an outer tube), a piston (e.g., an inner tube), and a sliding tube cylinder, thus involving three tubes/cylinders. A landing gear structure that includes an OLEO shock strut may be compressed into a retracted configuration for stowage in the wheel well during flight. However, achieving the retracted configuration may require compressing the compressible gas to an undesirably high pressure. Additionally, such landing gear including mechanisms to compress the OLEO shock strut tend to be heavy and complex, thus creating potential disadvantages from aircraft efficiency, maintenance, and manufacture standpoints.

Generally, to avoid compressing the OLEO shock strut, to enable retracting the landing gear into the wheel well, pivoting truck levers are employed with a linkage mechanism that pivots the truck lever to shorten a length of the landing gear upon retraction of the landing gear. The linkage mechanism is generally coupled to the structure of the landing gear, which landing gear structure drives the linkage mechanism to pivot the truck lever.

SUMMARY

The following is a non-exhaustive list of examples, which may or may not be claimed, of the subject matter according to the present disclosure.

One example of the subject matter according to the present disclosure relates to a shrink mechanism for use with a landing gear of an aircraft, the landing gear including an outer sleeve at least partially surrounding a shock strut, the shrink mechanism comprising: a shaft rotatably coupled to the outer sleeve about a shaft rotation axis, the shaft being disposed perpendicular to a centerline of the shock strut; an anchor arm coupled to the shaft, the anchor arm being configured to couple to a structure within a wing of the aircraft; a shrink arm coupled to the shaft, the shrink arm and the anchor arm being coupled to the shaft so as to rotate as a unit with the shaft about the shaft rotation axis; and a shrink link rotatably coupled to the shrink arm, the shrink link being configured to rotatably couple to the shock strut.

Another example of the subject matter according to the present disclosure relates to a landing gear for use on an aircraft, the landing gear comprising: an outer sleeve; a shock strut positioned at least partially within the outer sleeve; and a shrink mechanism coupled to the outer sleeve and the shock strut, the shrink mechanism being configured to move the shock strut relative to the outer sleeve, the shrink mechanism including a shaft rotatably coupled to the outer sleeve about a shaft rotation axis, the shaft being disposed perpendicular to a centerline of the shock strut; an anchor arm coupled to the shaft, the anchor arm being configured to couple to a structure within a wing of the aircraft; a shrink arm coupled to the shaft, the shrink arm and the anchor arm being coupled to the shaft so as to rotate as a unit with the shaft about the shaft rotation axis; and a shrink link rotatably coupled to the shrink arm, the shrink link being configured to rotatably couple to the shock strut.

Still another example of the subject matter according to the present disclosure relates to an aircraft comprising: a landing gear including a shock strut and an outer sleeve at least partially surrounding the shock strut; and a shrink mechanism coupled to the outer sleeve and the shock strut, the shrink mechanism being configured to move the shock strut relative to the outer sleeve, the shrink mechanism including a shaft rotatably coupled to the outer sleeve about a shaft rotation axis, the shaft being disposed perpendicular to a centerline of the shock strut, an anchor arm coupled to the shaft, the anchor arm being configured to couple to a structure within a wing of the aircraft, a shrink arm coupled to the shaft, the shrink arm and the anchor arm being coupled to the shaft so as to rotate as a unit with the shaft about the shaft rotation axis, and a shrink link rotatably coupled to the shrink arm, the shrink link being configured to rotatably couple to the shock strut.

Still another example of the subject matter according to the present disclosure relates to a method of operating a landing gear of an aircraft, the method comprising: rotating the landing gear about a trunnion axis of rotation, the trunnion axis of rotation being defined by an outer sleeve of the landing gear; and moving a shock strut relative to the outer sleeve with a shrink mechanism, where the outer sleeve at least partially surrounds the shock strut and the shrink mechanism includes: a shaft rotatably coupled to the outer sleeve about a shaft rotation axis, the shaft being disposed perpendicular to a centerline of the shock strut, an anchor arm coupled to the shaft, the anchor arm being configured to couple to a structure within a wing of the aircraft, a shrink arm coupled to the shaft, the shrink arm and the anchor arm being coupled to the shaft so as to rotate as a unit with the shaft about the shaft rotation axis, and a shrink link rotatably coupled to the shrink arm, the shrink link being configured to rotatably couple to the shock strut.

Still another example of the subject matter according to the present disclosure relates to an anti-rotation linkage for use with a landing gear having an outer sleeve and a shock strut positioned at least partially within the outer sleeve, the anti-rotation linkage comprising: a connector plate coupled to the shock strut; and an anti-rotation link assembly coupled to both the outer sleeve and the connector plate, the anti-rotation link assembly being configured to maintain the shock strut in a fixed rotational orientation relative to the outer sleeve.

BRIEF DESCRIPTION OF THE DRAWINGS

Figure 1A:
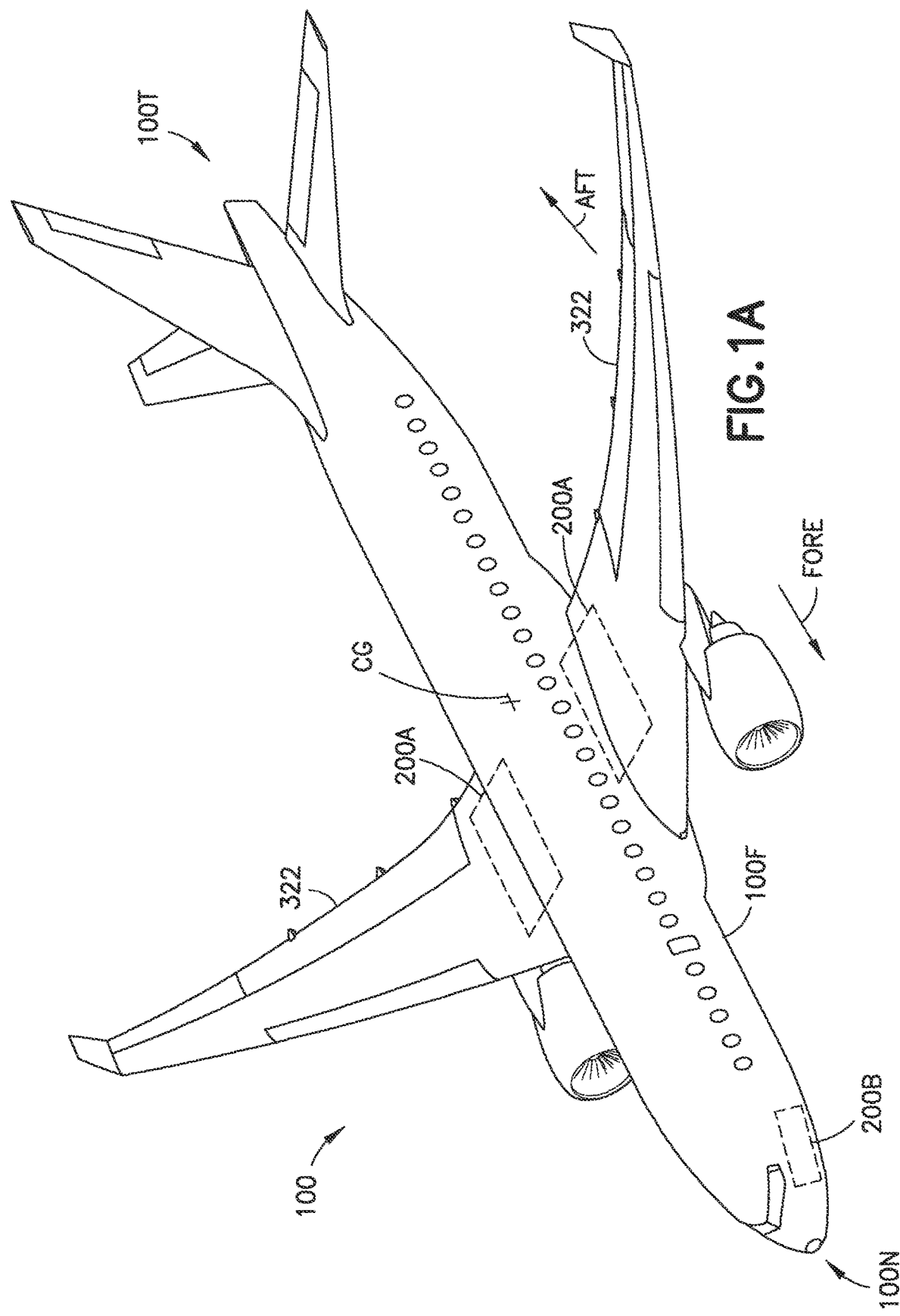
Figure 1B:
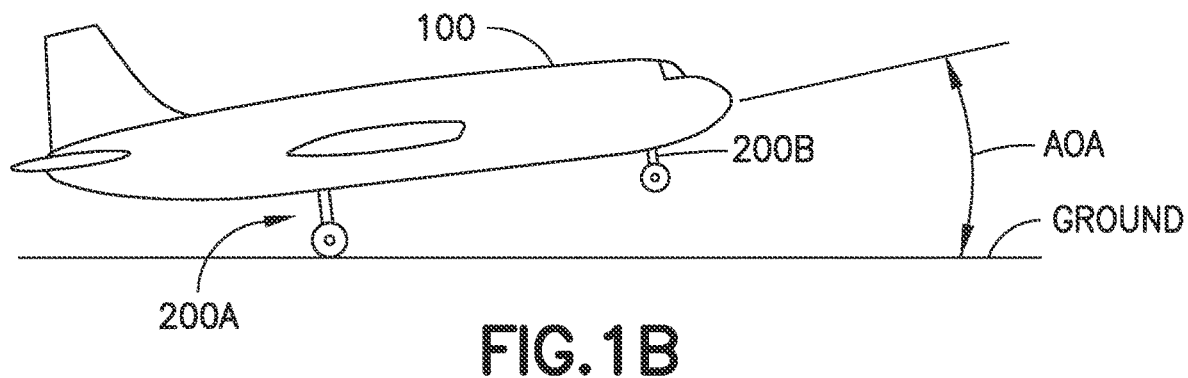
Figure 1C:
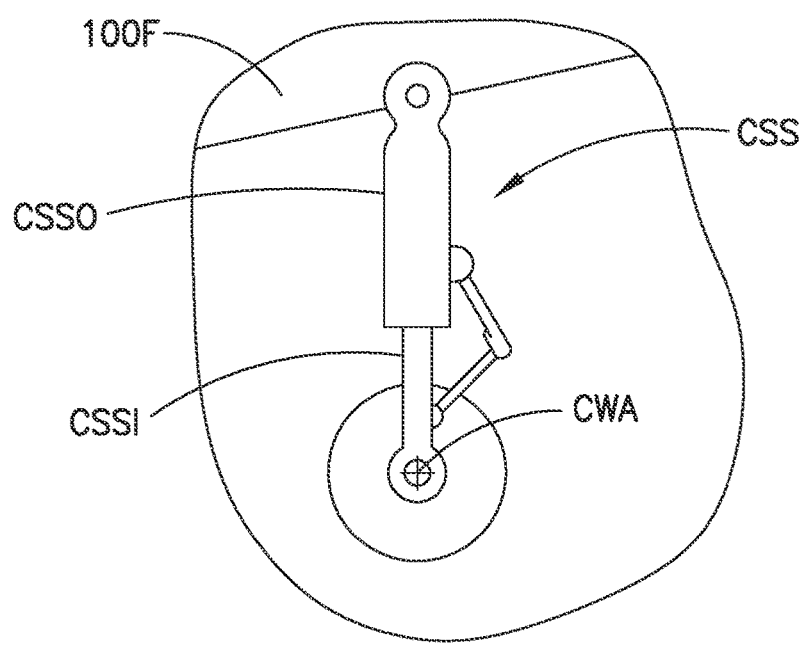
Figure 2A:
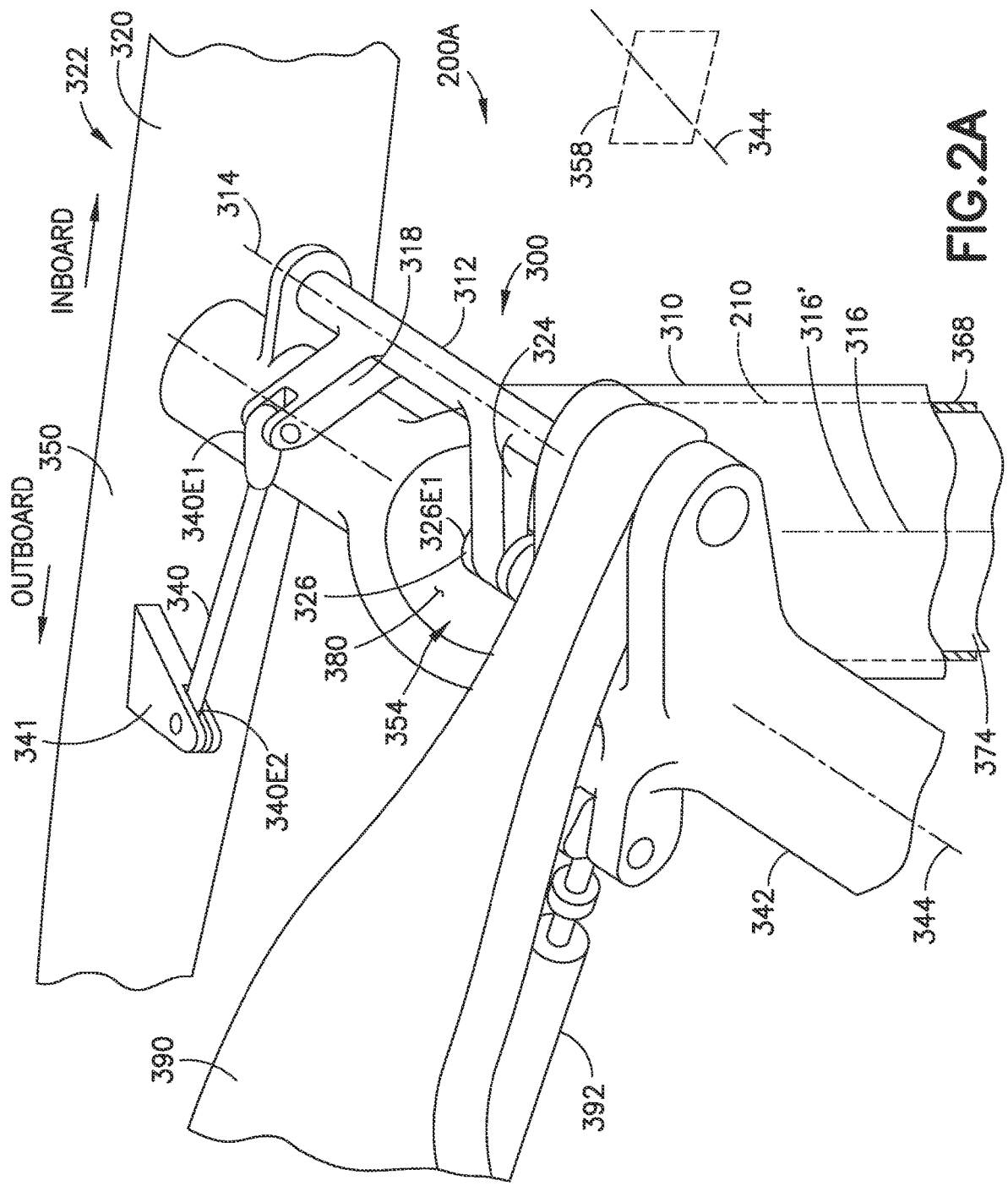
Figure 2B:
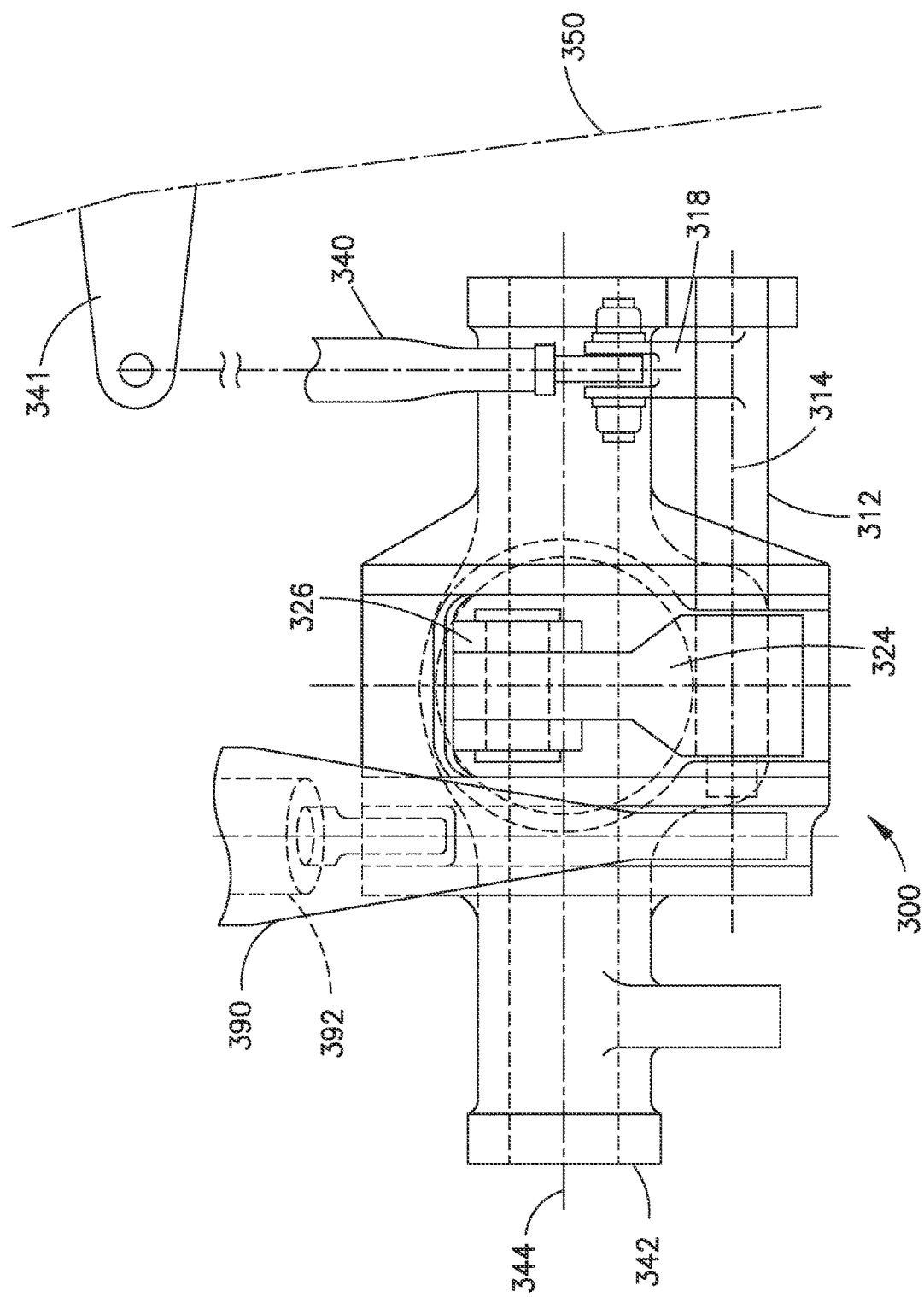
Figure 2C:
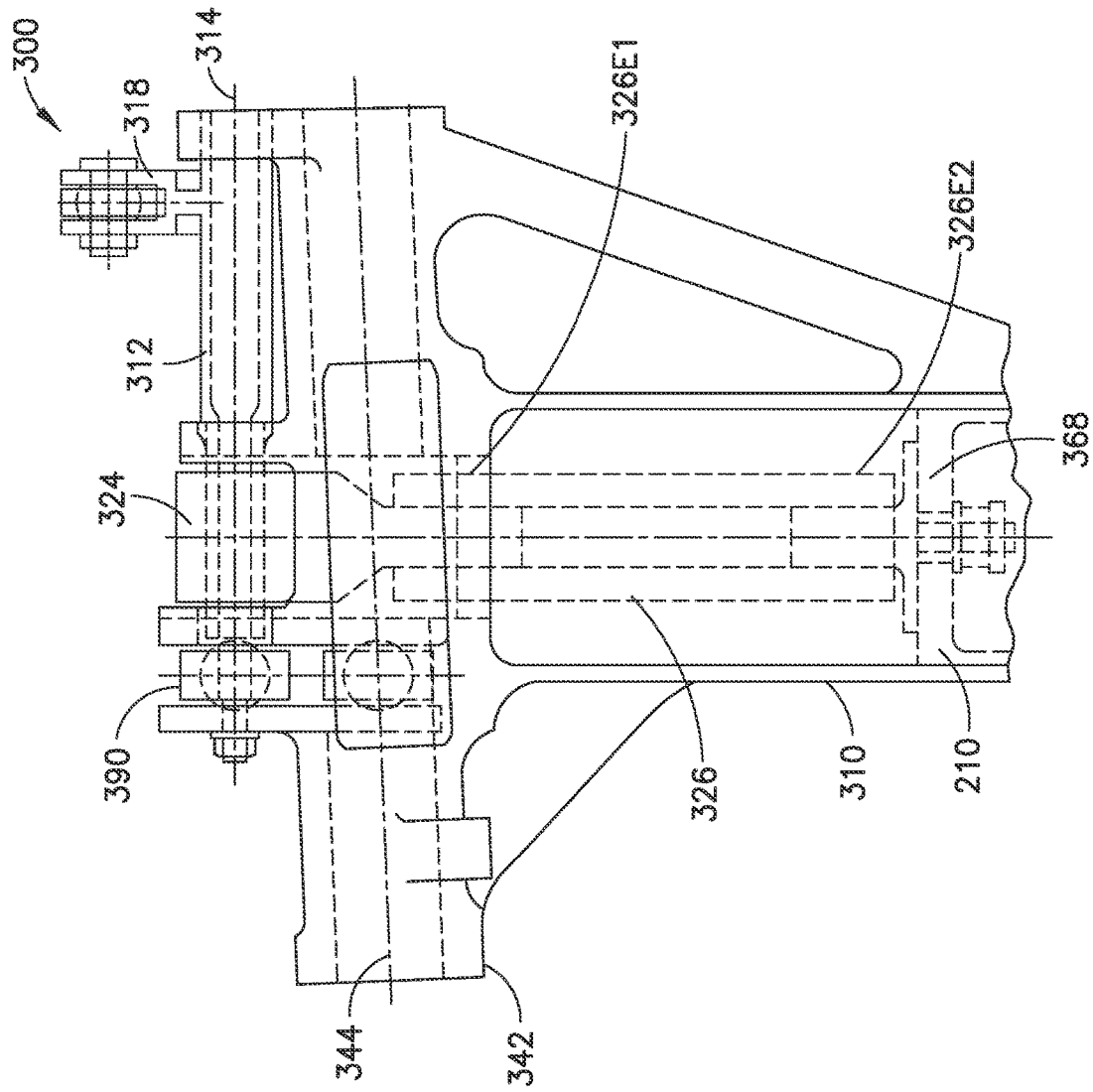
Figure 2D:
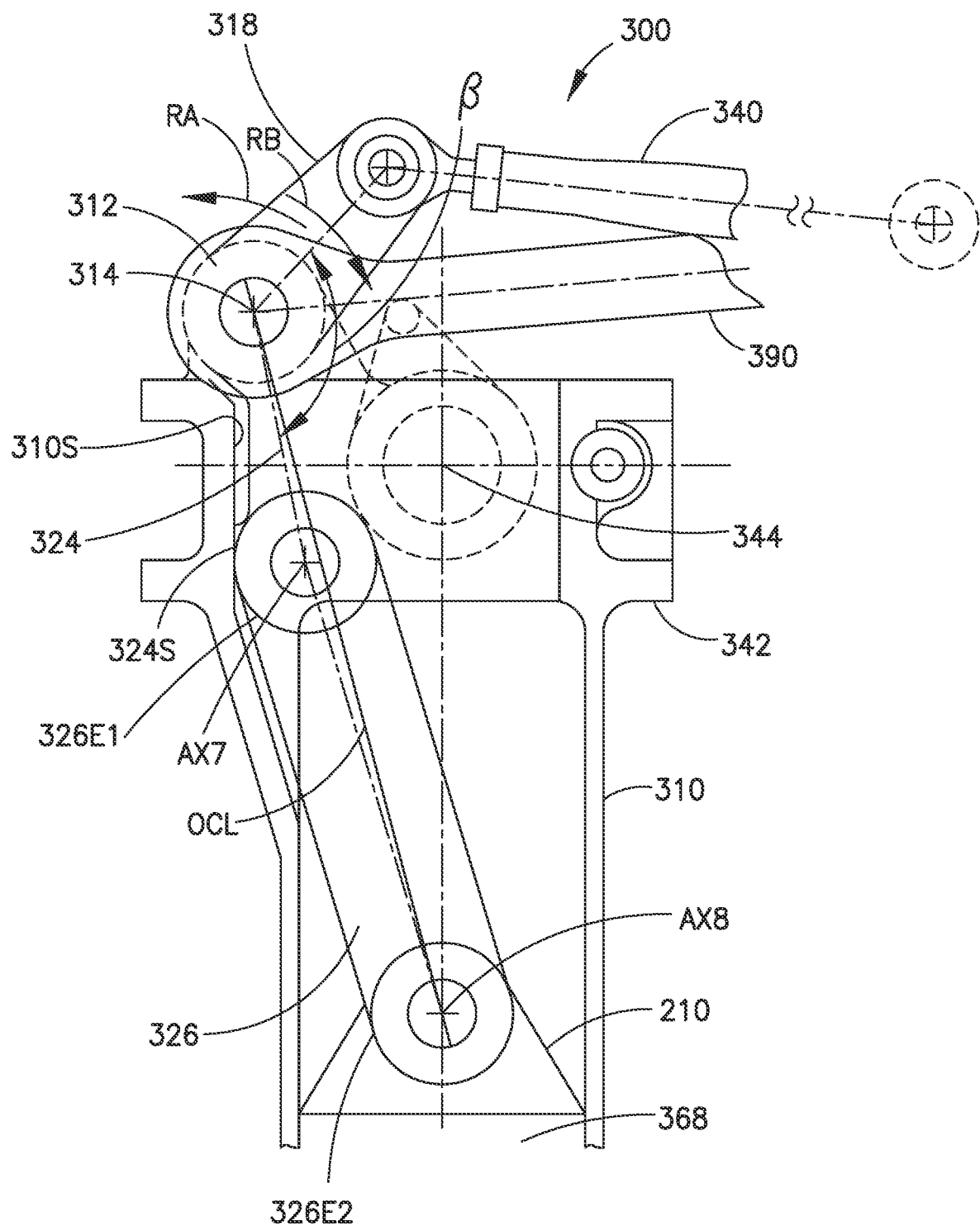
Figure 4:
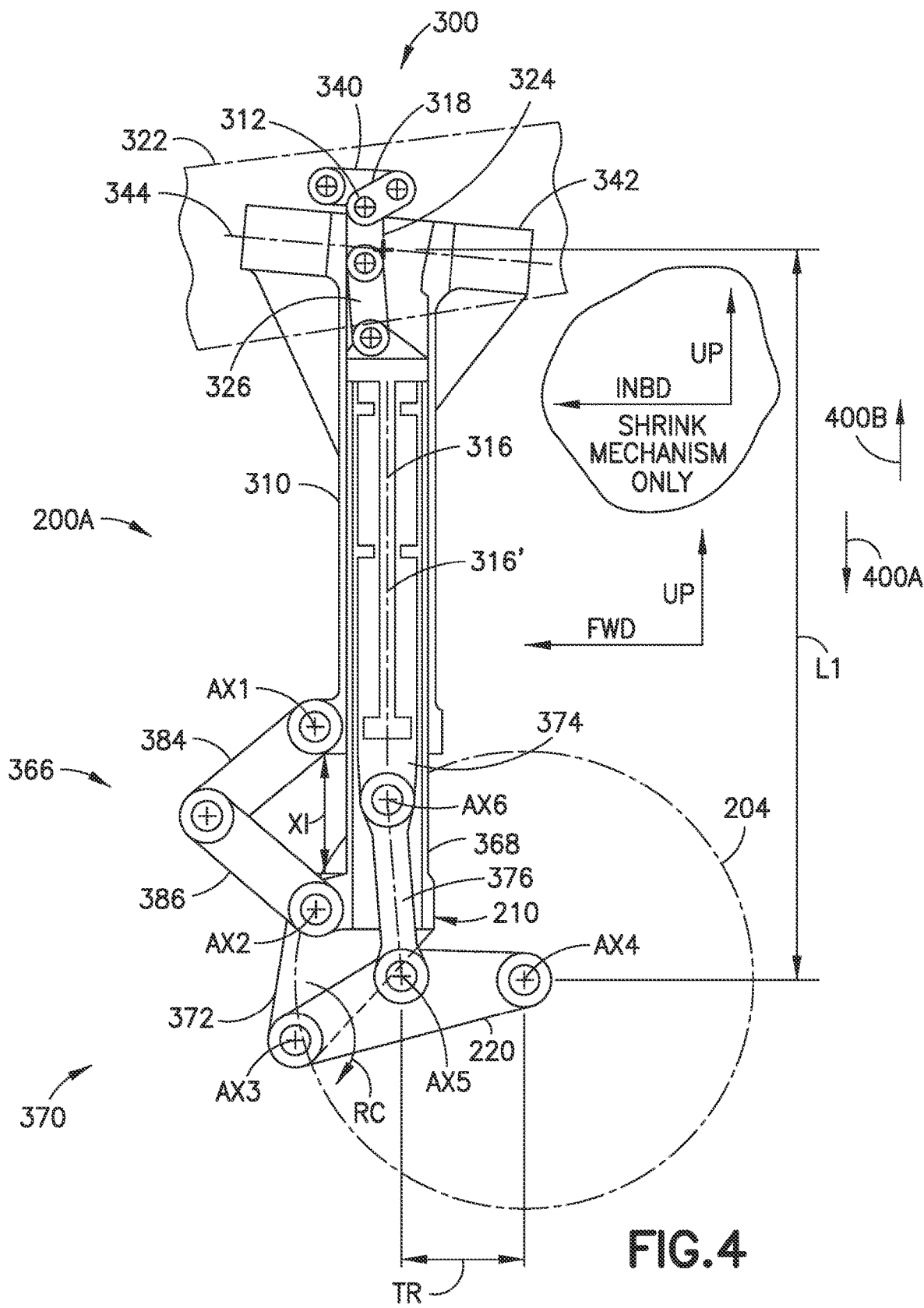
Figure 5:
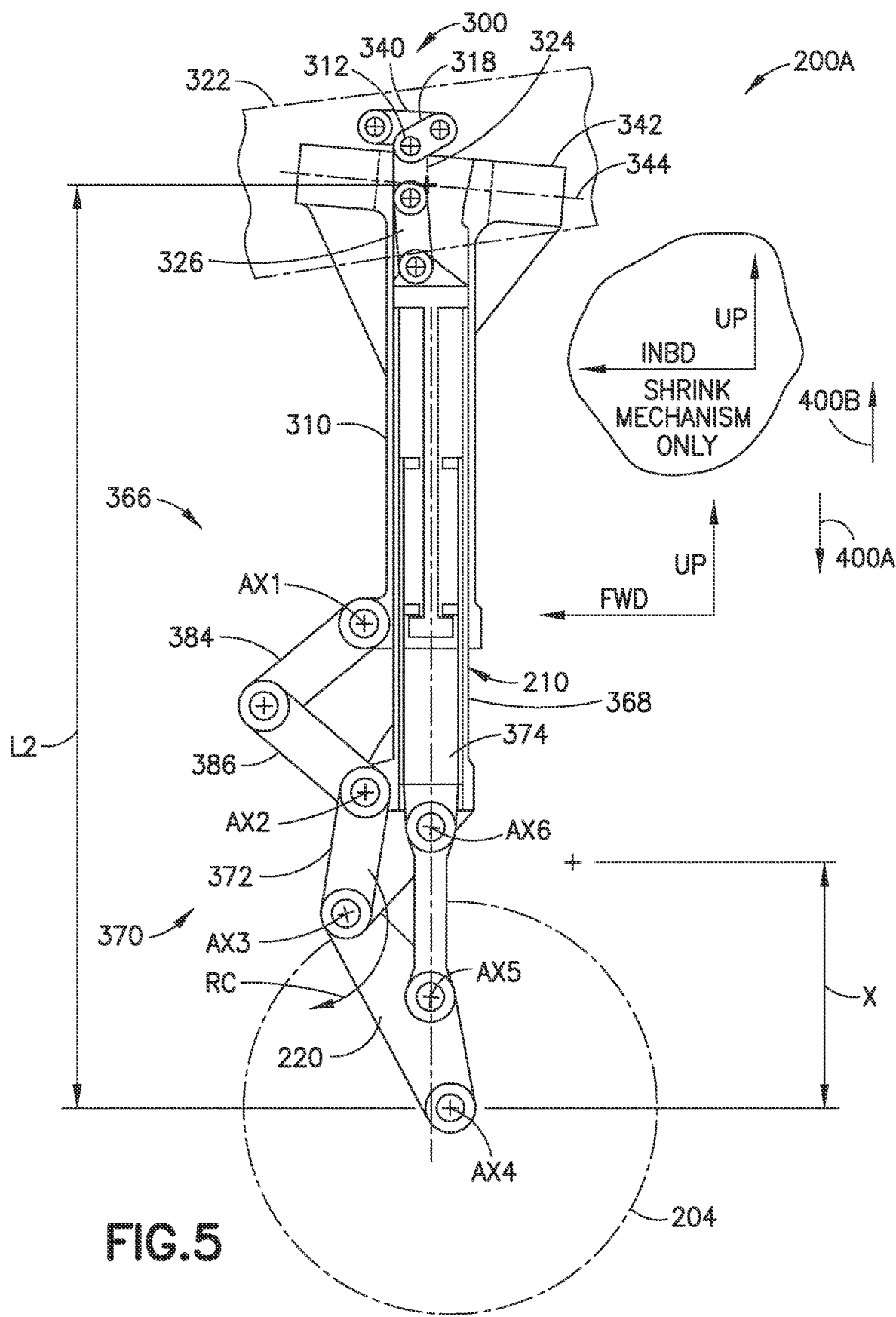
Figure 6:
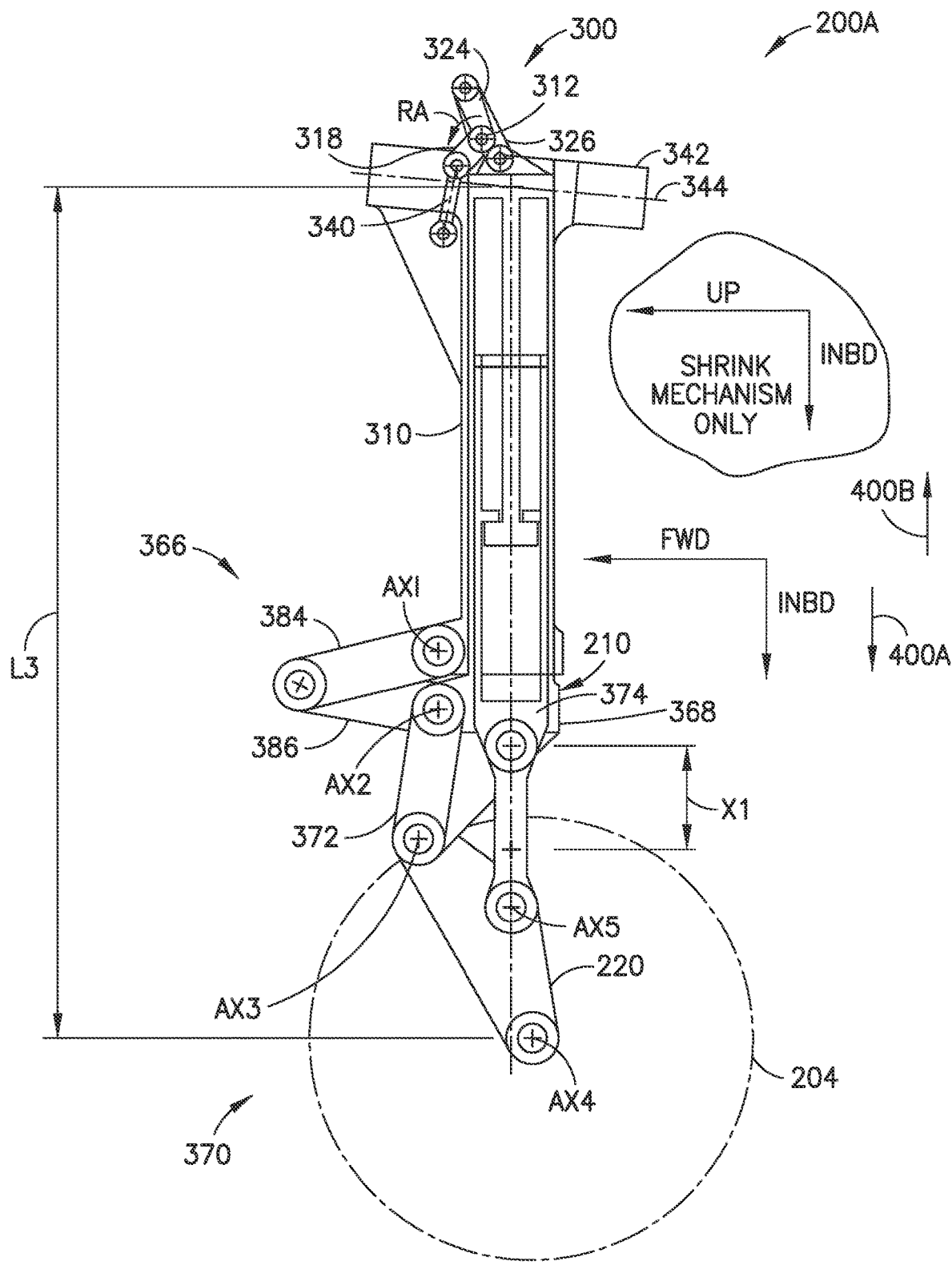
Figure 7:
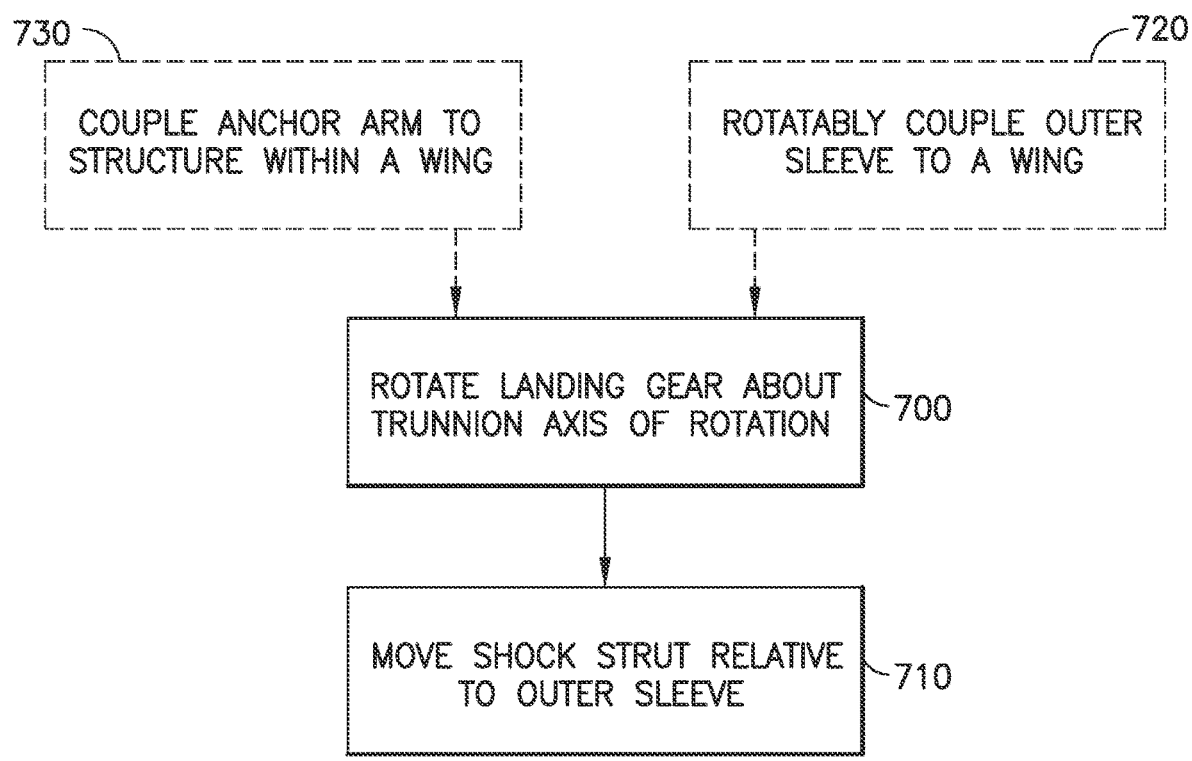
Figure 8A:
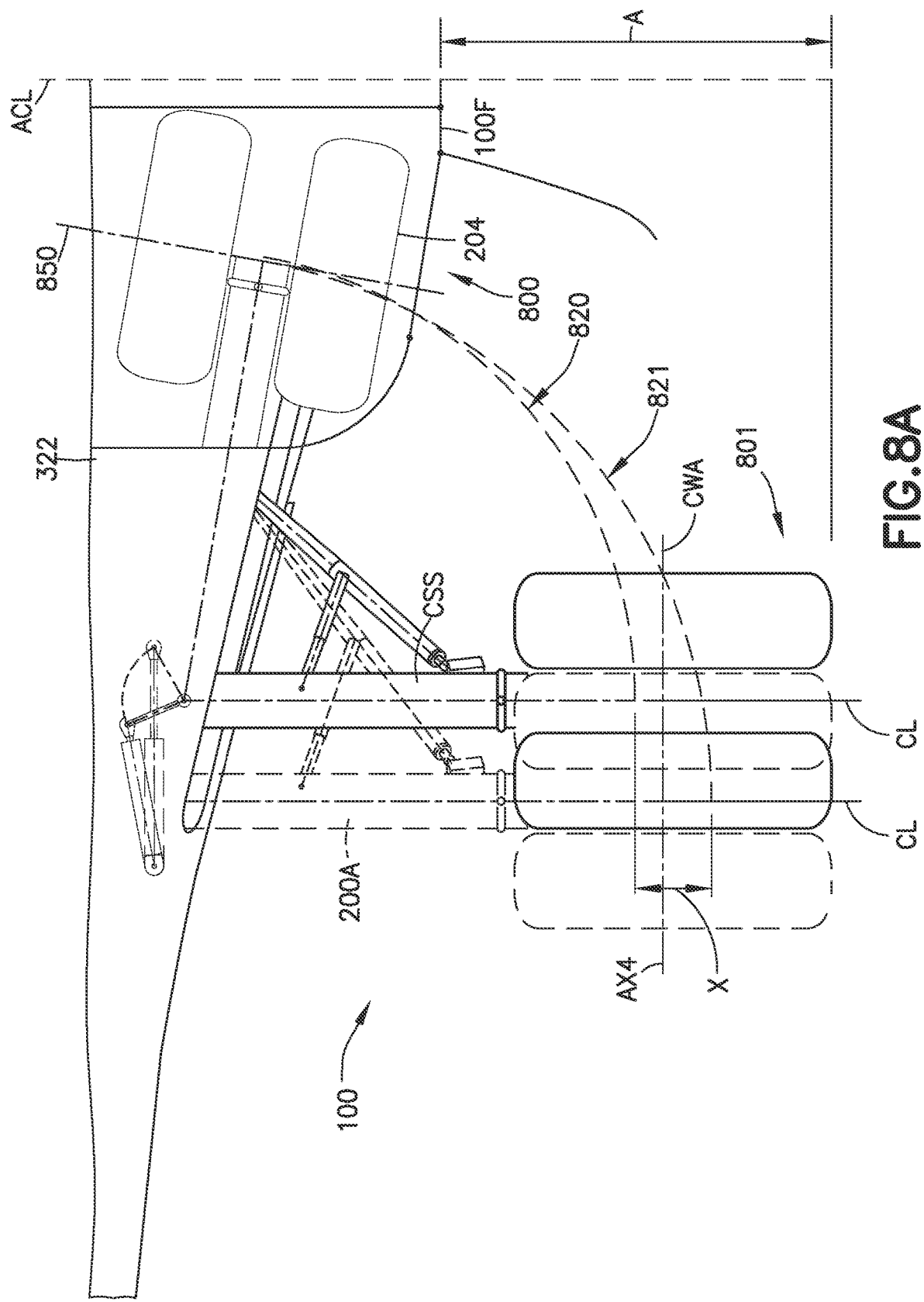
Figure 8B:
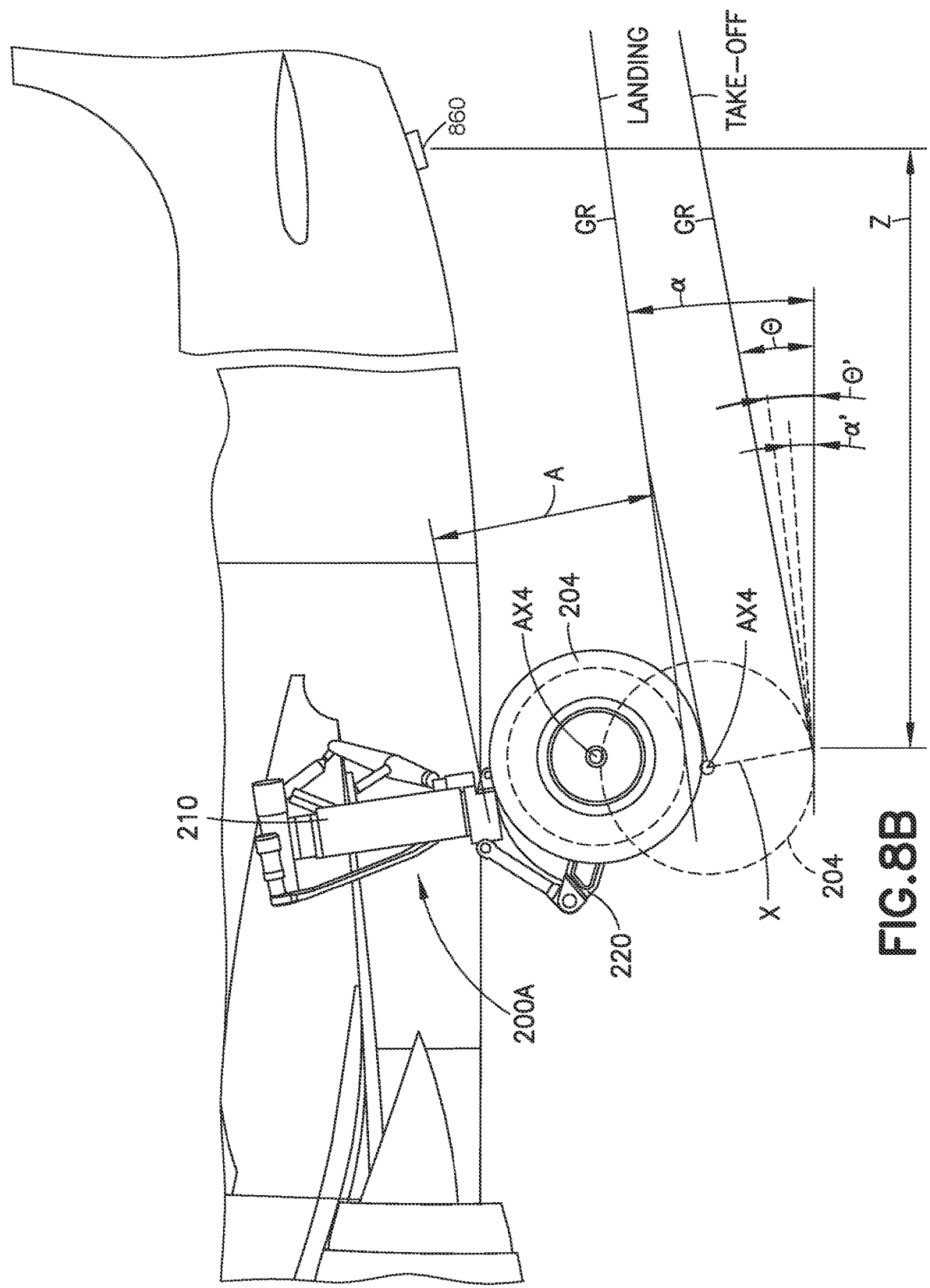

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic illustration of an aircraft in accordance with aspects of the present disclosure;

FIG. 1B is a schematic illustration of the aircraft of FIG. 1 in accordance with aspects of the present disclosure;

FIG. 1C is a schematic illustration of a conventional landing gear;

FIG. 2A is a schematic perspective view of a portion of a landing gear in accordance with aspects of the present disclosure;

FIG. 2B is a schematic top view of the landing gear of FIG. 2A in accordance with aspects of the present disclosure;

FIG. 2C is a schematic front view of the landing gear of FIG. 2A in accordance with aspects of the present disclosure;

FIG. 2D is a schematic side view of the landing gear of FIG. 2A in accordance with aspects of the present disclosure;

FIG. 3 is a schematic side view of the landing gear of FIG. 2A in accordance with aspects of the present disclosure;

FIG. 3A is a schematic illustration of a portion of the landing gear of FIG. 2A in accordance with aspects of the present disclosure;

FIG. 4 is a schematic side view of the landing gear of FIG. 2A in accordance with aspects of the present disclosure;

FIG. 5 is a schematic side view of the landing gear of FIG. 2A in accordance with aspects of the present disclosure;

FIG. 6 is a schematic side view of the landing gear of FIG. 2A in accordance with aspects of the present disclosure;

FIG. 7 is a flow diagram of a method in accordance with aspects of the present disclosure;

FIG. 8A is a schematic front view of a portion of the aircraft of FIG. 1A in accordance with aspects of the present disclosure;

FIG. 8B is a schematic side view of a portion of the aircraft of FIG. 1A in accordance with aspects of the present disclosure;

FIG. 9A is a schematic side view of a portion of the landing gear of FIG. 2A in accordance with aspects of the present disclosure; and FIG. 9B is a schematic side view of a portion of the landing gear of FIG. 2A in accordance with aspects of the present disclosure.

DETAILED DESCRIPTION

Referring to FIGS. 1A-1C, an aircraft 100 generally includes an airframe 100F, wings 322, main landing gear 200A, and nose landing gear 200B. During take-off, the nose 100N of the aircraft 100 rotates upward and the tail 100T rotates downward to achieve an angle-of-attack AOA at take-off. The longer the aircraft 100, the longer/taller the landing gear is to achieve the angle-of-attack AOA. Lengthening the landing gear can cause at least a couple of issues. For example, if the aircraft 100 is more than six (6) feet (1.8 meters (m)) off of the ground, the aircraft 100 must include over-wing slides integrated into the aircraft 100. Further, longer landing gear has an associated a larger wheel well, which may require costly redesign of the aircraft 100. At least some landing gear is designed to extend and retract to obtain the benefits of longer landing gear while maintaining the same landing gear length on the ground (e.g., conventional ride height) and in the wheel well compared to conventional landing gear CSS (FIG. 1C) having a single shock strut (which includes an outer cylinder CSSO and an inner cylinder CSSI and a single wheel axle CWA coupled to the inner cylinder). Generally, the landing gear designed to extend and retract to obtain the benefits of longer landing gear, while maintaining the convention ride height, includes complex mechanisms within the shock strut to extend and retract the landing gear to achieve the additional landing gear length at take-off. The more complex mechanisms within the landing gear allow all of the landing gear components to be contained within the landing gear (e.g., the complex mechanisms are coupled only to the structure of the landing gear). For example, such complex mechanisms may include a shrink link that attaches to a walking beam of the landing gear. While this simplifies the interface to the airframe 100F structure, it can also limit the amount of rotation of the shrink link, thus limiting an amount of retraction/extension of the shock strut provided by the shrink link.

Referring to FIG. 1A, the aspects of the present disclosure overcome the deficiencies of conventional landing gear as well as improve on the landing gear designed to extend and retract to obtain the benefits of longer landing gear (e.g., with complex shrink mechanisms carried by and coupled only to components of the landing gear). For example, the aspects of the present disclosure provide a landing gear 200A that includes a shrink mechanism that increases a length of the landing gear 200A when the landing gear 200A is extended and decreases the length of the landing gear 200A when the landing gear is retracted into a stowage position within the aircraft 100. The shrink mechanism of the landing gear 200A couples (or grounds) to the wing structure rather than being coupled (or grounded) to another component of the landing gear 200A (e.g., such as a retract actuator or walking beam of the landing gear) as will be described in greater detail herein. Coupling the shrink mechanism of the present disclosure to the wing structure independent of (e.g., outside of) the landing gear 200A provides the shrink mechanism with an increased rotation (compared to shrink mechanisms grounded to the landing gear structure) so that a shock strut coupled to the shrink mechanism can be retracted/extended a greater distance compared to a distance of retraction/extension of the shrink mechanisms grounded to the landing gear structure. The shrink mechanism in accordance with the aspects of the present disclosure, by virtue of the increased rotation of the shrink mechanism, can be used with a shortened conventional shock strut, rather than having complex inner workings in the shock strut.

The landing gear 200A, in accordance with the aspects of the present disclosure, includes a semi-levered (trailing arm) suspension that includes a conventional OLEO (a pneumatic air-oil hydraulic) shock strut that is extended and retracted as a unit by a shrink mechanism, where the shrink mechanism is grounded to a structure of the respective wing 322 of the aircraft 100. Grounding the shrink mechanism to the structure of the respective wing 322 provides the shrink mechanism with at least 180 degrees of rotation for extending and retracting the OLEO shock strut. The landing gear 200A including the shrink mechanism, in accordance with the aspects of the present disclosure, provides a landing gear 200A that is designed to extend and retract to obtain the benefits of longer landing gear, while maintaining the conventional ride height and conventional length in the wheel well (when compared to, e.g., conventional landing gear CSS illustrated in FIG. 1C), with only one OLEO shock strut. As such, the landing gear 200A with the shrink mechanism of the aspects of the present disclosure can provide for higher reliability and less complexity compared to other attempts at increasing the length of aircraft landing gear with complex mechanisms. As a further example, of the reduced complexity that can be provided by the aspects of the present disclosure, the shrink mechanism of the landing gear 200A is a two-dimensional mechanism (e.g., the shrink mechanism acts substantially only in a single plane of the aircraft 100). The landing gear of the present disclosure also avoids or reduces large bending loads introduced into the OLEO shock strut.

In another aspect of the present disclosure, the shrink mechanism enables a top-of-strut seal to reduce or substantially eliminate any debris accumulation within the landing gear 200A.

The aspects of the present disclosure may also provide the landing gear 200A with an anti-rotation linkage 366 (see, e.g., FIG. 4) that prevents the OLEO shock strut 210 (FIG. 4) from rotating with respect to the shrink mechanism 300 (see, e.g., FIG. 4) and, for example, an outer sleeve 310 (see, e.g., FIG. 4) of the landing gear (as described in greater detail herein). More specifically, the anti-rotation linkage 366 couples to both the outer sleeve 310 and an outer cylinder 368 (see, e.g., FIG. 4) of the shock strut to prevent relative rotation of the OLEO shock strut 210, the outer sleeve 310 and the shrink mechanism 300. It is noted that coupling of the shrink link to the walking beam or retract actuator can prevent relative rotation between the sleeve and shock strut; however, the anti-rotation linkage in the present disclosure can be used on more conventional landing gear independent of the walking beam and retract actuator.

Referring now to FIGS. 2A, 2B, 2C, and 2D, as described above, the landing gear 200A includes a shrink mechanism 300 coupled to (e.g., grounded) to any suitable structure 320 of a respective wing 322, where the structure 322 is disposed within the wing and is separate and distinct from the landing gear 200. For example the structure 320 is a rear spar 350 of the respective wing 322. In accordance with aspects of the present disclosure, the landing gear 200A includes an outer sleeve 310, a shock strut 210, and the shrink mechanism 300. The outer sleeve 310 forms an opening 354 that extends along longitudinal axis 316. The outer sleeve 310 is coupled to a trunnion 342 of the landing gear 200A where the trunnion 342 is coupled to the structure 320 of the wing 322 for rotation about rotation axis 344. In one aspect, the outer sleeve 310 and the trunnion 342 are integrally formed as a one piece monolithic member. The shock strut 210 includes an outer cylinder 368 and an inner cylinder 374, and is disposed at least partially within the opening 354 so that a longitudinal axis 316' of the shock strut 210 is substantially coincident with the longitudinal axis 316 of the outer sleeve 310. The longitudinal axis 316, 316' is considered a centerline of the shock strut 210. The opening 354 is configured so that the shock strut 210 linearly moves along the longitudinal axis 316 within the opening 354 as will be described herein. A walking beam 390 and retract actuator 392 are coupled to trunnion 342 in a conventional manner to retract the landing gear 200A to a stowage position within the aircraft 100 (FIG. 1).

In accordance with the aspects of the present disclosure, the shrink mechanism 300 is provided for use with the landing gear 200A of the aircraft 100 (FIG. 1), where the landing gear 200A includes the outer sleeve 310, which at least partially surrounds the shock strut 210. The shrink mechanism 300 includes a shaft 312, a shrink link 326, and a rod 340. The shaft 312 is rotatably coupled to the outer sleeve 310 in any suitable manner for rotation about a shaft rotation axis 314. The shaft rotation axis 314 is spatially arranged relative to the outer sleeve 310 so as to be substantially perpendicular to the longitudinal axis 316 of the outer sleeve 310, as well as the longitudinal axis 316' of the shock strut 210. The shaft 312 includes an anchor arm 318 that is coupled to the shaft 312 in any suitable manner. In one aspect, the anchor arm 318 is integrally formed with the shaft as a one piece monolithic member. The anchor arm 318 is configured to couple to the structure 320 within the respective wing 322 of the aircraft 100 in any suitable manner, such as through the rod 340. The shaft 312 also includes a shrink arm 324 that is coupled to the shaft 312 in any suitable manner. In one aspect the shrink arm 324 is integrally formed with the shaft 312 as a one piece monolithic member. As such, the coupling between each of the shrink arm 324 and the anchor arm 318 with the shaft 312 is such that both the shrink arm 324 and the anchor arm 318 rotate as a unit with the shaft 312 about the shaft rotation axis 314. The shrink arm 324 and anchor arm 318 may be arranged at any suitable angle β relative to one another, where the angle β may depend on a grounding location of the rod (e.g. inboard, outboard, etc.) on the structure 320 of the respective wing 322.

The rod 340 includes a first end 340E1 and a second end 340E2 that is longitudinally spaced from the first end 340E1. The first end 340E1 of the rod 340 is pivotally coupled to the anchor arm 318. The second end 340E2 of the rod 340 is pivotally coupled to the structure 320 of the respective wing 322 in any suitable manner. For example, the wing structure 322 may include any suitable stanchion or protrusion 341 to which the second end 340E2 of the rod 340 is pivotally coupled. It is noted that while the rod 340 extends from the anchor arm 318 in an outboard direction, in other aspects the rod 340 may extend in an inboard direction for coupling to the structure 320 of the respective wing 322 in a manner substantially similar to that described above. In accordance with the aspects of the present disclosure, the shrink mechanism 300 is coupled to the structure 320 of the respective wing 322, via the rod 340, independent of both the walking beam 390 and the retract actuator 392. This allows for increased rotation of the shaft 312 (compared to shrink mechanisms carried solely by the landing gear and grounded to the walking beam and/or retract actuator) which results in an increase in linear translation of the shock strut 210 (again, compared to shrink mechanisms carried solely by the landing gear and grounded to the walking beam and/or retract actuator) within the outer sleeve 310 for extending and retracting the shock strut relative to the outer sleeve 310.

Still referring to FIGS. 2A-2D, the shrink link 326 includes a first end 326E1 that is rotatably coupled to the shrink arm 324. The shrink link 326 also includes a second end 326E2 that is longitudinally spaced from the first end 326E1, where the second end 326E2 is configured to rotatably coupled to the shock strut 210 in any suitable manner. For example, the outer cylinder 368 of the shock strut 210 is configured for rotatably coupling with the second end 326E2 of the shrink link 326. As will be described in greater detail below, the shrink arm 324 rotates about shaft rotation axis 314 so that the shrink link 326, coupled to the shrink arm 324, travels within the outer sleeve 310 to extend and retract the landing gear 200A (e.g., to extend and retract the shock strut 210 relative to the outer sleeve 310).

As described above, the shrink mechanism 300 is a two-dimensional mechanism in that the shrink mechanism 300 acts substantially in a single plane 358. For example, substantially all movements of the shrink mechanism 300 exist within the plane 358 defined by the inboard/outboard directions and the longitudinal axis 316' of the shock strut 210 (which longitudinal axis 316' is coincident with the longitudinal axis 316 of the outer sleeve 310). Configuring shrink mechanism 300 so that the movements of the shrink mechanism are in a single plane 358 may reduce bending moments exerted on the landing gear 200A by the shrink mechanism 300, and may reduce bending moments within the shrink mechanism 300 itself. In addition, the planar, two-dimensional, nature of the shrink mechanism 300 may reduce bearing misalignment requirements in the joints of the shrink mechanism 300 (e.g., the pivotal/rotational couplings between the different links 340, 318, 324, 326 of the shrink mechanism 300). The planar, two-dimensional, nature of the shrink mechanism 300 may also minimize an integration volume (e.g., a volume reserved for the shrink mechanism 300 within the aircraft 100) of the shrink mechanism 300.

Referring now to FIG. 3, a side view of the landing gear 200A is illustrated with the shock strut 210 substantially fully compressed. It is noted that the shrink mechanism 300 is rotated 90 degrees relative to the rest of the landing gear 200A for clarity purposes only (e.g. so that the movement of the shrink mechanism can be illustrated). As can be seen in FIG. 3, a coordinate system (e.g. UP, Inbound) is illustrated for shrink mechanism 300 while the coordinate system (e.g. Up, Forward) is illustrated for the rest of the landing gear 200A. As described above, the landing gear 200A is a semi-levered landing gear that includes the outer sleeve 310, the trunnion 342, and a shock strut 210 disposed at least partially within the opening 354 of the outer sleeve 310. The landing gear 200A further includes a connector plate 372, an anti-rotation linkage 366, a truck link 220, and a strut arm 376. The outer cylinder 368 of the shock strut 210 forms part of a semi-lever mechanism 370 and the semi-lever mechanism 370 forms part of the anti-rotation linkage 366. The connector plate 372 and truck link 220 also form parts of the semi-lever mechanism 370.

The connector plate 372 is coupled to the outer cylinder 368 of the shock strut 210 in any suitable manner. In one aspect, the connector plate 372 is integrally formed with the outer cylinder 368 as a one piece monolithic member. In one aspect, referring to FIG. 3A, the connector plate 372 is a forked shaped member that includes fork tines 372T that straddle at least a portion of the truck link 220. In other aspects, the connector plate 372 may have any suitable configuration.

Still referring to FIG. 3, the anti-rotation linkage 366 is coupled to both the outer sleeve 310 and the shock strut 210. The anti-rotation linkage 366 is configured to maintain wheels 204 coupled to the shock strut 210 in a predetermined rotational orientation (e.g. about the longitudinal axis 316, 316') relative to the outer sleeve 310. The anti-rotation linkage 366 further includes an anti-rotation link assembly 382. The anti-rotation link assembly 382 includes two or more links. For example, the anti-rotation link assembly 382 includes a first link 384 and a second link 386 (in other aspects the anti-rotation link assembly 382 may have more than two links). The first link 384 is rotatably coupled at a first end 384E1 to the outer sleeve 310 in any suitable manner about pivot axis AX1. A second end 384E2 of the first link 384 is rotatably coupled to a first end 386E1 of the second link 386. A second end 386E2 of the second link 386 is rotatably coupled to the connector plate 372 in any suitable manner about pivot axis AX2. As such, the anti-rotation link assembly 382 rotationally fixes (i.e., prevents relative rotation) the connector plate 372 (and the outer cylinder 368) to the outer sleeve 310.

The truck link 220 is pivotally coupled to the connector plate 372 about pivot axis AX3 in any suitable manner. The truck link 220 also includes a wheel axis AX4, along which a single wheel axle 378 is located. The wheel(s) 204 rotate about the wheel axis AX4 on the wheel axle 378. The truck link 220 is also pivotally coupled to inner cylinder 374 of the shock strut 210. For example, a first end 376E1 of a strut arm 376 is pivotally coupled to the truck link 220 about pivot axis AX5. The strut arm 376 also includes a second end 376E2 longitudinally spaced from the first end 376E1. The second end 376E2 is pivotally coupled to the inner cylinder 374 about pivot axis AX6. It is noted that the pivot axis AX5 is positioned between the pivot axis AX3 and the wheel axis AX4 such that an arc AX5R through which the pivot axis AX5 travels during truck link 220 rotation (about pivot axis AX3) is localized about the longitudinal axis 316, 316' (e.g. the pivot axis AX5 is substantially in-line with the longitudinal axis 316, 316' throughout the arc AX5R of travel). As such, the force F exerted by the truck link 220, through the strut arm 376, on the shock strut 210 acts substantially along the longitudinal axis 316, 316' thereby reducing or eliminating any moment loads on the shock strut 210. As described above, because the anti-rotation link assembly 382 prevents rotation of the connector plate 372, the anti-rotation link assembly 382 also prevents rotation of the truck link 220 about the longitudinal axis 316, 316'.

As described above, the shock strut 210 moves linearly (e.g., reciprocates) within the outer sleeve 310 along the longitudinal axis 316, 316'. For example, the opening 354 of the outer sleeve 310 includes a cylindrical guide surface 380 (see also FIG. 2A) configured to engage and guide sliding movement of the outer cylinder 368 of the shock strut 210 to extend and retract the landing gear 200A, e.g., to extend and retract the shock strut 210 relative to the outer sleeve 310. Generally the opening 354 in the outer sleeve 310 and the shock strut 210 are cylindrical (e.g., tubular) so that the shock strut 210 may rotate within the opening 354 relative to the outer sleeve 310. Further, the outer cylinder 368 and inner cylinder 374 of the shock strut 210 are also cylindrical such that the inner cylinder 374 and outer cylinder 368 may rotate relative to one another (and the outer sleeve 310). The anti-rotation linkage 366 is configured to maintain each of the outer cylinder 368, the inner cylinder 374, and the wheel(s) 204 in a fixed rotational orientation (about the longitudinal axis 316, 316') relative to the outer sleeve 310. For example as described above, the connector plate 372 is coupled to the outer cylinder 368 so that the connector plate 372 and the outer cylinder 368 cannot rotate relative to each other. The rotational orientation of the outer sleeve 310 is fixed by virtue of being coupled to the airframe 100F (FIG. 1) by the trunnion 342. The anti-rotation link assembly 382, as described above, couples the outer sleeve 310 to the shock strut 210 (e.g. the anti-rotation link assembly 382 is coupled to the outer cylinder 368 through the connector plate 372). As such, the anti-rotation link assembly 382 prevents relative rotation between the outer sleeve 310 and the outer cylinder 368 of the shock strut 210. Rotation of the truck link 220 about the longitudinal axis 316, 316' is also prevented by the anti-rotation link assembly 382 by virtue of the pivotal coupling between the truck link 220 and the connector plate 372, only providing rotation of the truck link 220 about pivot axis AX3. As such, the anti-rotation linkage 366 prevents rotation of the wheel(s) 204 about the longitudinal axis 316, 316' and maintains the wheel(s) 204 in a predetermined rotational orientation (e.g., about the longitudinal axis 316, 316') relative to the outer sleeve 310 (and the airframe 100F). It is noted that the strut arm 376 prevents relative rotation between the inner cylinder 274 (which is rotationally fixed to the truck link 220, relative to the longitudinal axis 316, 316', by the strut arm 376) of the shock strut 210 and the outer cylinder 368 (which is rotationally fixed to the outer sleeve, relative to the longitudinal axis 316, 316', by the anti-rotation linkage 366) of the shock strut 210.

Referring to FIGS. 3 and 4, as described above, the landing gear 200A is a semi-levered landing gear that includes semi-levered mechanism 370. The semi-levered mechanism 370 includes the outer cylinder 368 (including the connector plate 372), the truck link 220, and the strut arm 376. In one aspect, the semi-levered mechanism 370 provides a trailing arm configuration that provides an amount of trail TR (see FIG. 4) relative to, for example, the longitudinal axis 316, 316'. In one aspect, the amount of trail TR may be about 10 inches (25.4 centimeters (cm)), while in other aspects the amount of trail TR may be more or less than about 10 inches (25.4 cm). The trail TR provided by the aspects of the present disclosure may provide for movement of the center of gravity CG (FIG. 1) of the aircraft 100 (FIG. 1) towards the tail 100T during, for example, aft loading of the aircraft 100 when the aircraft is on the ground. For example, the trail TR may reduce or substantially eliminate any moment generated by an offset between the center of gravity CG and the reaction force provided by the landing gear 200A when the center of gravity CG is moved aft towards the tail 100T.

Referring to FIGS. 2D, 3, 4, 5, 6, and 7, an exemplary operation of the landing gear 200A and the shrink mechanism 300 will be described. It is noted that FIG. 3 illustrates the landing gear 200A in an un-stowed position (e.g., outside the wheel well for take-off, landing and taxiing of the aircraft 100 (FIG. 1)) with the shock strut 210 in a substantially fully compressed configuration. FIG. 4 illustrates the landing gear 200A in an un-stowed position (e.g., outside the wheel well for take-off, landing and taxiing of the aircraft 100 (FIG. 1)) with the shock strut 210 in under compression, on the ground, with a static 1G load applied. FIG. 5 illustrates the landing gear 200A in an un-stowed position (e.g., outside the wheel well for take-off, landing and taxiing of the aircraft 100 (FIG. 1)) with the shock strut 210 substantially fully extended to provide additional landing gear height X during take-off and landing of the aircraft 100 (FIG. 1). In one aspect, the additional landing gear height X combined with the travel of the shock strut 210 provides the landing gear 200A with about 28 inches (71.1 cm) of travel, while in other aspects the amount of travel may be more or less than about 28 inches (71.1 cm). FIG. 6 illustrates the landing gear 200A in a stowed position (e.g., inside the wheel well of the aircraft 100 (FIG. 1)) with the shock strut 210 substantially fully extended but retracted within the outer sleeve 310 to shorten a length of the landing gear 200A. It is noted that in each of FIGS. 3-6 the shrink mechanism 300 is rotated 90 degrees relative to the rest of the landing gear 200A for clarity purposes only (e.g., so that the movement of the shrink mechanism can be illustrated). As can be seen in FIG. 3-6, a coordinate system (e.g., "UP, Inbound" with the landing gear 200A in an un-stowed positon and "UP, Inboard" with the landing gear 200A in a stowed position) is illustrated for shrink mechanism 300 while the coordinate system (e.g., Up, Forward) is illustrated for the rest of the landing gear 200A.

Referring to FIGS. 2D and 3, with the landing gear 200A in the un-stowed position, the shrink mechanism 300 locks the shock strut 210 in an extended position relative to the outer sleeve 310 so that the outer cylinder 368 of the shock strut extends a distance X1 from the outer sleeve 310. For example, the outer sleeve 310 is rotatably coupled to the wing 322 as described above (FIG. 7, Block 720) and the anchor arm 318 is coupled to the structure 320 of the wing 322 (FIG. 7, Block 730) as described above. As can be seen best in FIG. 2D, with the outer sleeve 310 rotatably coupled to the wing 322 and the anchor arm 318 coupled to the structure 320, the shrink mechanism 300 forms an over-center lock that holds the shock strut 210 in the extended position relative to the outer sleeve 310. For example, as the landing gear 200A is moved from the stowed position 801 (FIG. 8A) to the un-stowed position 800 (FIG. 8A) the shaft 312 and the outer sleeve 310 rotate relative to each other such that the shaft 312 is rotated relative to the outer sleeve 310 in direction RB. Relative rotation between the shaft 312 and the outer sleeve 310 continues until a stop surface 324S of the shrink arm 324 contacts a corresponding stop surface 310S of the outer sleeve 310. As can be seen in FIG. 2D, a pivot axis AX7 at which the shrink arm 324 is rotatably coupled to the shrink link 326 is rotated passed a centerline OCL extending between the axis 314 and the pivot axis AX8 (about which the shrink link 326 is pivotally coupled to the outer cylinder 368).

As the shock strut 210 extends from being substantially fully compressed, as illustrated in FIG. 3, to the static 1G ride height position illustrated in FIG. 4, the inner cylinder 374 moves in direction 400A causing the truck link 220 to rotate in direction RC. The static ride height position illustrated in FIG. 4 provides the landing gear 200A with a length L1 that, in turn, may provide available wheel 204 travel to absorb bumps, etc. during taxiing of the aircraft 100 (FIG. 1). As the weight of the aircraft 100 is reduced (via lift provided by the wings 322 (FIG. 1)) during take-off, the inner cylinder 374 of the shock strut extends further in direction 400A relative to the outer cylinder 368 as shown in FIG. 5. This further extension of the inner cylinder 374 causes rotation of the truck link 220 in direction RC to provide the landing gear with additional height X at take-off. The additional height X provides the landing gear with an extended length L2 at take-off.

Referring again to FIG. 2D as well as FIG. 6, after take-off the landing gear 200A is moved to the stowed position 800 (FIG. 8A) through actuation of the retract actuator 392 (FIG. 2A). Retraction of the landing gear 200A to the stowed position 800 (FIG. 8A) rotates the landing gear 200A about the trunnion axis of rotation 344 (FIG. 7, Block 700). As described above, rotating the landing gear 200A about the trunnion axis of rotation 344 causes relative rotation between the shaft 312 and the outer sleeve 310. When the landing gear 200A is moved to the stowed position 800 (FIG. 8A), the shaft 312 rotates relative to the outer sleeve 310 in direction RA by virtue of the coupling between the shaft 312 and the structure 320 (FIG. 2A) of the wing 322

(FIG. 2A) provided by the rod 340. The relative rotation of the shaft 312 in direction RA also causes the shrink arm 324 to rotate in direction RA. The rotation of the shrink arm 324 in direction RA moves the shrink link 326 in direction 400B within the outer sleeve 310 to retract the shock strut 210. Because the shrink link 326 is coupled to the outer cylinder 368 of the shock strut 210, the shock strut 210 also moves relative to the outer sleeve 310 in direction 400B (FIG. 7, Block 710) so that the shock strut 210 is retracted into the outer sleeve 310 by the distance X1. As can be seen in FIG. 6, the retraction of the shock strut 210 into the outer sleeve 310 by the distance X1 provides the landing gear 200A with a stowed length of L3 which is smaller than the length L2. It is noted that when the landing gear is stowed, the shock strut is substantially uncompressed. Moving the landing gear 200A from the stowed position 800 (FIG. 8A) to the un-stowed position 801 (FIG. 8A) occurs in substantially the reverse manner from that described above.

Referring to FIGS. 1A, 8A, and 8B, as the aircraft 100 accelerates down a runway, the wings 322 create lift. The lift created by the wings 322 reduces the weight of the aircraft 100 applied to the landing gear 200A. The reduction in weight of the aircraft 100 applied to the landing gear 200A causes the shock strut 210 to extend or uncompress. Extension of the shock strut 210 causes relative movement between an inner cylinder 374 (FIG. 3) of the shock strut 210 and outer cylinder 368 of the shock strut 210. The relative movement of the inner cylinder 374 and outer cylinder 368 during extension of the shock strut 210 causes the truck lever 220 to rotate in direction RC (FIG. 5) to a takeoff height position, as seen best in FIG. 8B (see also FIG. 5), which may provide the aircraft 100 with additional height X relative to the static ride height A (see also FIG. 8A) of the aircraft 100 (e.g., the ride height A is increased by height X at the takeoff height of the landing gear 200A). The additional height X, which is greater than the amount of extension provided by the shock strut 210 alone, provides for a predetermined angle of rotation θ of the aircraft 100 relative to the ground GR, as seen in FIG. 7B, upon takeoff and provides for a predetermined angle of rotation a (e.g., angle of attack) of the aircraft 100 relative to ground GR upon landing. Here the angles of rotation θ, α are increased compared to takeoff and landing angles of rotation θ', α' of the aircraft 100 when equipped with a conventional single axle landing gear CSS (see FIGS. 1C and 8A—noting that in FIG. 8A the conventional landing gear CSS and landing gear 200A are illustrated side by side for exemplary purposes only, otherwise the landing gear 200A and the conventional landing gear would be arranged along a common centerline CL relative to the airframe 100F centerline ACL) as seen in FIG. 7B where wheel travel is limited only by an amount of travel of the conventional shock strut CSS and the distance Z between a ground contact patch of the wheel(s) 204 and a tail skid pad 860 of the aircraft 100 remains the same for the aircraft 100.

Because the landing gear 200A can be coupled to the airframe 100F in substantially the same location as the conventional landing gear, and because the shock strut 210 is retractable into the outer sleeve 310, the landing gear 200A may fit within a conventional wheel well substantially without any modification to the aircraft 100 design. In other aspects, the landing gear may be retrofit to existing aircraft. For example, referring to FIG. 8A, a wheel retract path 820 for the conventional landing gear having shock strut CSS is illustrated compared to a wheel retract path 821 for the landing gear 200A. As can be seen in FIG. 8, while the wheel retract paths 820, 821 are separated by a distance corresponding to the additional height X of the landing gear 200A when the landing gears are in an un-stowed position (such as during takeoff and landing), the wheel retract paths converse to a common path 850 within the wheel well allowing the landing gear 200A to fit within an existing wheel well. In addition, as can be seen in FIG. 8A, the landing gear 200A may provide the aircraft 100 with the same static ride height A as the conventional landing gear with shock strut CSS.

Referring now to FIGS. 9A and 9B, the landing gear 200A may also include a hinged door 352 that is configured to engage and substantially seal a top of the opening 354 of the outer sleeve 310 with the landing gear 200A in the un-stowed position 801 (FIG. 8A). The hinged door 352 is slaved with at least one linkage of the shrink mechanism 300 in any suitable manner. For example, the hinged door 352 includes a first door portion 694 and a second door portion 396 that are pivotally coupled to each other with hinge 356. The first door portion 694 may be coupled to, for example, the shrink arm 324 so as to be spatially fixed with respect to the shrink arm 324. For example, the coupling between the shrink arm 324 and the first door portion 394 is such that the shrink arm 324 and the first door portion 394 rotate as a single unit about the shaft rotation axis 314. The second door portion 396, being hinged to the first door portion also rotates with the shrink arm 324 about the shaft rotation axis 314; however, as the shrink arm 324 rotates in direction 900 a free end 396EF of the second door portion 396 engages an upper surface 310US of the outer sleeve 310 adjacent the opening 354.

As the shrink arm 324 continues to rotate in direction 900, the engagement between the free end 396EF causes relative rotation between the first door portion 394 and the second door portion 396 so that the hinged door flattens to substantially form a seal with the upper surface 310US of the outer sleeve thereby substantially sealing the opening 354. To maintain the seal, the second door portion 396 is biased relative to one or more of the first door portion 394 and the shrink arm 324 in any suitable manner, such as by any suitable biasing member. For example, the biasing member 398 may be a tension spring that couples the second door portion 396 to the shrink arm 324 to bias the second door portion in direction 902. In other aspects the biasing member 398 may be a torsion spring disposed at the hinge 356 to bias the second door portion in direction 902. The biasing member 398 also causes the hinged door to fold on itself when the shrink arm 324 is rotated in direction 324, such as when shock strut 210 is retracted into the outer sleeve 310 during the landing gear 200A stowage. For example, as the shrink link 324 rotates in direction 901 the biasing member 398 causes the second door portion 396 to rotate in direction 902 about the hinge 356 to fold the second door portion 396 relative to the first door portion 394. The folding of the hinged door 352 upon stowage reduces the amount of space occupied by the hinged door 352 so that, for example, the hinged door fits within existing wheel wells of the aircraft 100 (FIG. 1) substantially without modification to the wheel well.

The following are provided in accordance with the aspects of the present disclosure:

A1. A shrink mechanism for use with a landing gear of an aircraft, the landing gear including an outer sleeve at least partially surrounding a shock strut, the shrink mechanism comprising: a shaft rotatably coupled to the outer sleeve about a shaft rotation axis, the shaft being disposed perpendicular to a centerline of the shock strut; an anchor arm coupled to the shaft, the anchor arm being configured to couple to a structure within a wing of the aircraft; a shrink arm coupled to the shaft, the shrink arm and the anchor arm being coupled to the shaft so as to rotate as a unit with the shaft about the shaft rotation axis; and a shrink link rotatably coupled to the shrink arm, the shrink link being configured to rotatably couple to the shock strut.

A2. The shrink mechanism of paragraph A1, wherein the anchor arm is coupled to the structure with a rod.

A3. The shrink mechanism of paragraph A1, wherein the shock strut travels within the outer sleeve to extend and retract the landing gear.

A4. The shrink mechanism of paragraph A1, wherein the shrink arm rotates about shaft rotation axis and the shrink link travels within the outer sleeve to extend and retract the landing gear.

A5. The shrink mechanism of paragraph A1, wherein the outer sleeve is integrally formed as on piece with a landing gear trunnion and wherein the landing gear trunnion is rotatably coupled to the wing.

A6. The shrink mechanism of paragraph A1, wherein the anchor arm is configured to couple to a rear spar within a wing of the aircraft.

A7. The shrink mechanism of paragraph A1, wherein the structure within the wing is separate and distinct from the landing gear.

A8. The shrink mechanism of paragraph A1, further comprising a door coupled to the shrink arm, the door is configured to seal an opening in the outer sleeve with the landing gear in an extended position.

A9. The shrink mechanism of paragraph A8, wherein the door comprises a hinged door configured to engage the outer sleeve for sealing the opening.

A10. The shrink mechanism of paragraph A1, wherein the shrink link mechanism is configured to act in a single plane that is transverse to a rotation axis of a landing gear trunnion of the landing gear.

B1. A landing gear for use on an aircraft, the landing gear comprising: an outer sleeve; a shock strut positioned at least partially within the outer sleeve; and a shrink mechanism coupled to the outer sleeve and the shock strut, the shrink mechanism being configured to move the shock strut relative to the outer sleeve, the shrink mechanism including a shaft rotatably coupled to the outer sleeve about a shaft rotation axis, the shaft being disposed perpendicular to a centerline of the shock strut, an anchor arm coupled to the shaft, the anchor arm being configured to couple to a structure within a wing of the aircraft, a shrink arm coupled to the shaft, the shrink arm and the anchor arm being coupled to the shaft so as to rotate as a unit with the shaft about the shaft rotation axis, and a shrink link rotatably coupled to the shrink arm, the shrink link being configured to rotatably couple to the shock strut.

B2. The landing gear of paragraph B1 wherein the anchor arm is coupled to the structure with a rod.

B3. The landing gear of paragraph B1 wherein the shock strut travels within the outer sleeve to extend and retract the landing gear.

B4. The landing gear of paragraph B1 wherein the shrink arm rotates about shaft rotation axis and the shrink link travels within the outer sleeve to extend and retract the landing gear.

B5. The landing gear of paragraph B1 wherein outer sleeve is integrally formed as one piece with a landing gear trunnion and wherein the landing gear trunnion is rotatably coupled to the wing.

B6. The landing gear of paragraph B1, wherein the anchor arm is configured to couple to a rear spar within a wing of the aircraft.

B7. The landing gear of paragraph B1, wherein the structure within the wing is separate and distinct from the landing gear.

B8. The landing gear of paragraph B1, further comprising a door coupled to the shrink arm, the door is configured to seal an opening in the outer sleeve with the landing gear in an extended position.

B9. The landing gear of paragraph B8, wherein the door comprises a hinged door configured to engage the outer sleeve for sealing the opening.

B10. The landing gear of paragraph B1, wherein the shrink link mechanism is configured to act in a single plane that is transverse to a rotation axis of a landing gear trunnion of the landing gear.

B11. The landing gear of paragraph B1, further comprising an anti-rotation linkage coupled to both the outer sleeve and the shock strut, the anti-rotation linkage being configured to maintain wheels coupled to the shock strut in a predetermined orientation relative to the outer sleeve.

B12. The landing gear of paragraph B11, wherein the landing gear is a semi-levered landing gear where an outer cylinder of the shock strut forms part of a semi-lever mechanism and the semi-lever mechanism forms part of the anti-rotation linkage.

B13. The landing gear of paragraph B12, wherein the semi-levered mechanism includes a connector plate coupled to the outer cylinder of the shock strut.

B14. The landing gear of paragraph B13, wherein the semi-lever mechanism includes a truck link pivotally coupled to the both the connector plate and an inner cylinder of the shock strut.

B15. The landing gear of paragraph B14, further comprising a strut arm coupling the inner cylinder to the truck link.

B16. The landing gear of paragraph B14, wherein the truck link includes a single wheel axle.

B17. The landing gear of paragraph B1, wherein the outer sleeve includes a cylindrical guide surface configured to engage and guide sliding movement of an outer cylinder of the shock strut to extend and retract the landing gear.

B18. The landing gear of paragraph B1, wherein the shock strut comprises an OLEO (a pneumatic air-oil hydraulic shock absorber) shock strut.

C1. An aircraft comprising: a landing gear including a shock strut and an outer sleeve at least partially surrounding the shock strut; and a shrink mechanism coupled to the outer sleeve and the shock strut, the shrink mechanism being configured to move the shock strut relative to the outer sleeve, the shrink mechanism including a shaft rotatably coupled to the outer sleeve about a shaft rotation axis, the shaft being disposed perpendicular to a centerline of the shock strut, an anchor arm coupled to the shaft, the anchor arm being configured to couple to a structure within a wing of the aircraft, a shrink arm coupled to the shaft, the shrink arm and the anchor arm being coupled to the shaft so as to rotate as a unit with the shaft about the shaft rotation axis, and a shrink link rotatably coupled to the shrink arm, the shrink link being configured to rotatably couple to the shock strut.

C2. The aircraft of paragraph C1 wherein the anchor arm is coupled to the structure with a rod.

C3. The aircraft of paragraph C1 wherein the shock strut travels within the outer sleeve to extend and retract the landing gear.

C4. The aircraft of paragraph C1 wherein the shrink arm rotates about shaft rotation axis and wherein shrink link travels within the outer sleeve to extend and retract the landing gear.

C5. The aircraft of paragraph C1 wherein outer sleeve is integrally formed with a landing gear trunnion and wherein the landing gear trunnion is rotatably coupled to the wing.

C6. The aircraft of paragraph C1, wherein the anchor arm is configured to couple to a rear spar within a wing of the aircraft.

C7. The aircraft of paragraph C1, wherein the structure within the wing is separate and distinct from the landing gear.

C8. The aircraft of paragraph C1, further comprising a door coupled to the shrink arm, the door is configured to seal an opening in the outer sleeve with the landing gear in an extended position.

C9. The aircraft of paragraph C8, wherein the door comprises a hinged door configured to engage the outer sleeve for sealing the opening.

C10. The aircraft of paragraph C1, wherein the shrink link mechanism is configured to act in a single plane that is transverse to a rotation axis of a landing gear trunnion of the landing gear.

C11. The aircraft of paragraph C1, further comprising an anti-rotation linkage coupled to both the outer sleeve and the shock strut, the anti-rotation linkage being configured to maintain wheels coupled to the shock strut in a predetermined orientation relative to the outer sleeve.

C12. The aircraft of paragraph C11, wherein the landing gear is a semi-levered landing gear where an outer cylinder of the shock strut forms part of a semi-lever mechanism and the semi-lever mechanism forms part of the anti-rotation linkage.

C13. The aircraft of paragraph C12, wherein the semi-levered mechanism includes a connector plate coupled to the outer cylinder of the shock strut.

C14. The aircraft of paragraph C13, wherein the semi-lever mechanism includes a truck link pivotally couple to both the connector plate and an inner cylinder of the shock strut.

C15. The aircraft of paragraph C14, further comprising a strut arm coupling the inner cylinder to the truck link.

C16. The aircraft of paragraph C14, wherein the truck link includes a single wheel axle.

C17. The aircraft of paragraph C1, wherein the outer sleeve includes a cylindrical guide surface configured to engage and guide sliding movement of an outer cylinder of the shock strut to extend and retract the landing gear.

C18. The aircraft of paragraph C1, wherein the shock strut comprises an OLEO (a pneumatic air-oil hydraulic shock absorber) shock strut.

D1. A method of operating a landing gear of an aircraft, the method comprising: rotating the landing gear about a trunnion axis of rotation, the trunnion axis of rotation being defined by an outer sleeve of the landing gear; and moving a shock strut relative to the outer sleeve with a shrink mechanism, where the outer sleeve at least partially surrounds the shock strut and the shrink mechanism includes: a shaft rotatably coupled to the outer sleeve about a shaft rotation axis, the shaft being disposed perpendicular to a centerline of the shock strut, an anchor arm coupled to the shaft, the anchor arm being configured to couple to a structure within a wing of the aircraft, a shrink arm coupled to the shaft, the shrink arm and the anchor arm being coupled to the shaft so as to rotate as a unit with the shaft about the shaft rotation axis, and a shrink link rotatably coupled to the shrink arm, the shrink link being configured to rotatably couple to the shock strut.

D2. The method of paragraph D1, further comprising coupling the anchor arm to the structure with a rod.

D3. The method of paragraph D1, wherein the shock strut travels within the outer sleeve to extend and retract the landing gear.

D4. The method of paragraph D1, wherein the shrink arm rotates about shaft rotation axis and the shrink link travels within the outer sleeve to extend and retract the landing gear.

D5. The method of paragraph D1, further comprising rotatably coupling the outer sleeve to the wing about a trunnion axis of rotation such that the outer sleeve is integrally formed with a landing gear trunnion.

E1. An anti-rotation linkage for use with a landing gear having an outer sleeve and a shock strut positioned at least partially within the outer sleeve, the anti-rotation linkage comprising: a connector plate coupled to the shock strut; and an anti-rotation link assembly coupled to both the outer sleeve and the connector plate, the anti-rotation link assembly being configured to maintain the shock strut in a fixed rotational orientation relative to the outer sleeve.

E2. The anti-rotation linkage of paragraph E1, wherein the anti-rotation link assembly maintains wheels coupled to the shock strut in a predetermined orientation relative to the outer sleeve.

E3. The anti-rotation linkage of paragraph E1, wherein the landing gear is a semi-levered landing gear having a truck link pivotally coupled to the connector plate and at least one wheel rotatably coupled to the truck link.

E4. The anti-rotation linkage of paragraph E3, wherein the shock strut includes an outer cylinder movably disposed within the outer sleeve and an inner cylinder that is movable relative to the outer cylinder, the connector plate being coupled to the outer cylinder of the shock strut.

E5. The anti-rotation linkage of paragraph E4, wherein the truck link is pivotally coupled to both the connector plate and the inner cylinder of the shock strut.

E6. The anti-rotation linkage of paragraph E5, further comprising a strut arm coupling the inner cylinder to the truck link.

E7. The anti-rotation linkage of paragraph E1, wherein a single wheel axle is coupled to the shock strut.

E8. The anti-rotation linkage of paragraph E1, wherein the outer sleeve includes a cylindrical guide surface configured to engage and guide sliding movement of an outer cylinder of the shock strut.

E9. The anti-rotation linkage of paragraph E1, wherein the shock strut comprises an OLEO shock strut.

E10. The anti-rotation linkage of paragraph E1, wherein the link assembly comprises a first scissors link coupled to the outer sleeve; and a second scissors link coupled to the first scissors link and the connector plate to connect to the outer sleeve to the shock strut.

E11. A landing gear comprising: the outer sleeve; the shock strut; and the anti-rotation linkage of any one of paragraphs E1 to E10.

E12. The landing gear of paragraph E11 further comprising the shrink mechanism of any one of paragraphs A1 to A10.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. An aircraft comprising:
    a landing gear including:
        a shock strut;
        an outer sleeve at least partially surrounding the shock strut; and
        a shrink mechanism coupled to both the outer sleeve and the shock strut, the shrink mechanism being configured to move the shock strut relative to the outer sleeve, the shrink mechanism including:
            a shaft rotatably coupled to the outer sleeve about a shaft rotation axis, the shaft being disposed perpendicular to a centerline of the shock strut,
            an anchor arm coupled to the shaft, the anchor arm being configured to couple to a structure within a wing of the aircraft,
            a shrink arm coupled to the shaft, the shrink arm and the anchor arm being coupled to the shaft so as to rotate as a unit with the shaft about the shaft rotation axis, relative to the outer sleeve, at least 180° when the anchor arm is coupled to the structure within the wing of the aircraft, and a shrink link rotatably coupled to the shrink arm, the shrink link being configured to rotatably couple to the shock strut.

2. The aircraft of claim 1, wherein the anchor arm is coupled to the structure with a rod.

3. The aircraft of claim 1, wherein the shock strut travels within the outer sleeve to extend and retract the landing gear.

4. The aircraft of claim 1, wherein the shrink arm rotates about shaft rotation axis and wherein shrink link travels within the outer sleeve to extend and retract the landing gear.

5. The aircraft of claim 1, wherein the outer sleeve is integrally formed with a landing gear trunnion and wherein the landing gear trunnion is rotatably coupled to the wing.

6. The aircraft of claim 1, wherein the anchor arm is configured to couple to a rear spar within the wing of the aircraft.

7. The aircraft of claim 1, wherein the structure within the wing is separate and distinct from the landing gear.

8. The aircraft of claim 1, further comprising a door coupled to the shrink arm, the door is configured to seal an opening in the outer sleeve with the landing gear in an extended position.

9. The aircraft of claim 8, wherein the door comprises a hinged door configured to engage the outer sleeve for sealing the opening.

10. The aircraft of claim 1, wherein the shrink link mechanism is configured to act in a single plane that is transverse to a rotation axis of a landing gear trunnion of the landing gear.

11. A landing gear for use on an aircraft, the landing gear comprising:

an outer sleeve having a cylindrical guide surface;

a shock strut positioned at least partially within the outer sleeve, the shock strut comprising:

an outer cylinder that is shaped and sized to engage the cylindrical guide surface where the cylindrical guide surface guides sliding movement of the outer cylinder relative to the outer sleeve, and where the outer cylinder is configured to couple with a shrink mechanism configured to drive the sliding movement of the outer cylinder, and an inner cylinder disposed at least partly within the unitary outer cylinder; and an anti-rotation linkage comprising:

a connector plate coupled to the outer cylinder of the shock strut, and an anti-rotation link assembly coupled to both the outer sleeve and the connector plate, the anti-rotation link assembly being configured to maintain the shock strut in a fixed rotational orientation relative to the outer sleeve.

12. The landing gear of claim 11, wherein the anti-rotation link assembly maintains wheels coupled to the shock strut in a predetermined orientation relative to the outer sleeve.

13. The landing gear of claim 11, wherein the landing gear is a semi-levered landing gear having a truck link pivotally coupled to the connector plate and at least one wheel rotatably coupled to the truck link.

14. The landing gear of claim 13, wherein the inner cylinder is movable relative to the outer cylinder.

15. The landing gear of claim 14, wherein the truck link is pivotally coupled to both the connector plate and the inner cylinder of the shock strut.

16. The landing gear of claim 11, wherein the anti-rotation link assembly comprises:

a first scissors link coupled to the outer sleeve; and a second scissors link coupled to both the first scissors link and the connector plate to connect the outer sleeve to the shock strut.

17. The landing gear of claim 11, further comprising:

the shrink mechanism, where the shrink mechanism is coupled to both the outer sleeve and outer cylinder of the shock strut, the shrink mechanism comprising:

a shaft rotatably coupled to the outer sleeve about a shaft rotation axis, the shaft being disposed perpendicular to a centerline of the shock strut;

an anchor arm coupled to the shaft, the anchor arm being configured to couple to a structure within a wing of the aircraft;

a shrink arm coupled to the shaft, the shrink arm and the anchor arm being coupled to the shaft so as to rotate as a unit with the shaft about the shaft rotation axis, relative to the outer sleeve, at least 180° when the anchor arm is coupled to the structure within the wing of the aircraft; and a shrink link rotatably coupled to the shrink arm, the shrink link being configured to rotatably couple to the outer cylinder of the shock strut.

18. The landing gear of claim 17, wherein the anchor arm is coupled to the structure with a rod.

19. The landing gear of claim 17, wherein the shock strut travels within the outer sleeve to extend and retract the landing gear.

20. The landing gear of claim 17, wherein the shrink arm rotates about the shaft rotation axis and the shrink link travels within the outer sleeve to extend and retract the landing gear.

* * * * *